(12) United States Patent
Perkowski

(10) Patent No.: US 8,458,055 B2
(45) Date of Patent: *Jun. 4, 2013

(54) INTERNET-BASED METHOD OF AND SYSTEM FOR MANAGING AND DELIVERING CONSUMER PRODUCT INFORMATION AT POINTS ALONG THE WORLD WIDE WEB USING CONSUMER PRODUCT INFORMATION (CPI) REQUESTING AND GRAPHICAL USER INTERFACE (GUI) DISPLAYING SUBSYSTEMS DRIVEN BY SERVER-SIDE OBJECTS AND MANAGED BY CONSUMER PRODUCT MANUFACTURERS AND/OR AUTHORIZED PARTIES

(75) Inventor: Thomas J. Perkowski, Darien, CT (US)

(73) Assignee: IPF, Inc., Darien, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,283

(22) Filed: Nov. 9, 2011

(65) Prior Publication Data

US 2012/0233001 A1 Sep. 13, 2012

Related U.S. Application Data

(63) Continuation of application No. 12/454,031, filed on May 11, 2009, now Pat. No. 8,065,201, which is a continuation of application No. 11/261,415, filed on Oct. 28, 2005, now Pat. No. 7,533,040, which is a continuation of application No. 09/441,973, filed on Nov. 17, 1999, now Pat. No. 6,961,712, which is a continuation-in-part of application No. 09/284,917, filed as application No. PCT/US97/19227 on Oct. 27, 1997, now abandoned, and a continuation-in-part of application No. 08/936,375, filed on Sep. 24, 1997, now abandoned, and a continuation-in-part of application No. 08/871,815, filed on Jun. 9, 1997, now Pat. No. 7,143,055, and a continuation-in-part of application No. 08/854,877, filed on May 12, 1997, now Pat. No. 5,950,173, and a continuation-in-part of application No. 08/826,120, filed on Mar. 27, 1997, now abandoned, and a continuation-in-part of application No. 08/752,136, filed on Nov. 19, 1996, now Pat. No. 6,064,979, and a continuation-in-part of application No. 08/736,798, filed on Oct. 25, 1996, now Pat. No. 5,918,214.

(51) Int. Cl.
*G06F 17/30* (2006.01)

(52) U.S. Cl.
USPC .......................................... 705/27.1; 715/763

(58) Field of Classification Search
USPC .................................. 705/27.1, 763
See application file for complete search history.

(56) References Cited

U.S. PATENT DOCUMENTS

| | | | |
|---|---|---|---|
| 4,654,482 | A | 3/1987 | DeAngelis |
| 4,718,005 | A | 1/1988 | Feigenbaum et al. |
| 4,775,935 | A | 10/1988 | Yourick |
| 4,841,132 | A | 6/1989 | Kajitani et al. |
| 5,029,104 | A | 7/1991 | Dodson |
| 5,157,687 | A | 10/1992 | Tymes |
| 5,264,822 | A | 11/1993 | Vogelman et al. |
| 5,280,498 | A | 1/1994 | Tymes et al. |
| 5,288,976 | A | 2/1994 | Citron et al. |
| 5,297,249 | A | 3/1994 | Bernstein et al. |
| 5,307,456 | A | 4/1994 | MacKay |
| 5,319,542 | A | 6/1994 | King, Jr. et al. |
| 5,333,237 | A | 7/1994 | Stefanopoulos |
| 5,351,186 | A | 9/1994 | Bullock et al. |
| 5,355,472 | A | 10/1994 | Lewis |
| 5,398,336 | A | 3/1995 | Tantry et al. |
| 5,412,714 | A | 5/1995 | Bogart et al. |
| 5,434,974 | A | 7/1995 | Loucks et al. |
| 5,448,046 | A | 9/1995 | Swartz |
| 5,475,819 | A | 12/1995 | Miller et al. |
| 5,483,052 | A | 1/1996 | Smith, III et al. |
| 5,524,195 | A | 6/1996 | Clanton et al. |
| 5,528,490 | A | 6/1996 | Hill |
| 5,532,735 | A | 7/1996 | Blahut |
| 5,548,722 | A | 8/1996 | Jalalian et al. |
| 5,572,643 | A | 11/1996 | Judson |
| 5,583,560 | A | 12/1996 | Florin |

| | | |
|---|---|---|
| 5,592,378 A | 1/1997 | Cameron et al. |
| 5,594,509 A | 1/1997 | Florin et al. |
| 5,600,833 A | 2/1997 | Senn et al. |
| 5,612,527 A | 3/1997 | Ovadia |
| 5,635,694 A | 6/1997 | Tuhro |
| 5,640,193 A | 6/1997 | Wellner |
| 5,692,073 A | 11/1997 | Cass |
| 5,694,546 A | 12/1997 | Reisman |
| 5,715,444 A | 2/1998 | Danish et al. |
| 5,721,827 A | 2/1998 | Logan et al. |
| 5,724,521 A | 3/1998 | Dedrick |
| 5,737,619 A | 4/1998 | Judson |
| 5,737,739 A | 4/1998 | Shirley et al. |
| 5,740,549 A | 4/1998 | Reilly et al. |
| 5,742,768 A | 4/1998 | Gennaro et al. |
| 5,757,900 A | 5/1998 | Nagel et al. |
| 5,761,071 A | 6/1998 | Bernstein et al. |
| 5,764,906 A | 6/1998 | Edelstein et al. |
| 5,778,367 A | 7/1998 | Wesinger, Jr. et al. |
| 5,804,803 A | 9/1998 | Cragun et al. |
| 5,825,002 A | 10/1998 | Roslak |
| 5,838,906 A | 11/1998 | Doyle et al. |
| 5,841,978 A | 11/1998 | Rhoads |
| 5,854,897 A | 12/1998 | Radziewicz et al. |
| 5,864,823 A | 1/1999 | Levitan |
| 5,864,845 A | 1/1999 | Voorhees et al. |
| 5,864,846 A | 1/1999 | Voorhees et al. |
| 5,864,863 A | 1/1999 | Burrows |
| 5,869,819 A | 2/1999 | Knowles et al. |
| 5,881,230 A | 3/1999 | Christensen et al. |
| 5,890,135 A | 3/1999 | Powell |
| 5,890,175 A | 3/1999 | Wong et al. |
| 5,895,454 A | 4/1999 | Harrington |
| 5,897,622 A | 4/1999 | Blinn et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,913,040 A | 6/1999 | Rakavy et al. |
| 5,913,210 A | 6/1999 | Call |
| 5,918,010 A | 6/1999 | Appleman et al. |
| 5,918,213 A | 6/1999 | Bernard et al. |
| 5,918,214 A | 6/1999 | Perkowski |
| 5,923,884 A | 7/1999 | Payret et al. |
| 5,930,767 A | 7/1999 | Reber et al. |
| 5,933,811 A | 8/1999 | Angles et al. |
| 5,933,829 A | 8/1999 | Durst et al. |
| 5,937,390 A | 8/1999 | Hyodo |
| 5,937,392 A | 8/1999 | Alberts |
| 5,938,726 A | 8/1999 | Reber et al. |
| 5,940,074 A | 8/1999 | Britt et al. |
| 5,940,595 A | 8/1999 | Reber et al. |
| 5,946,646 A | 8/1999 | Schena et al. |
| 5,948,061 A | 9/1999 | Merriman et al. |
| 5,950,173 A | 9/1999 | Perkowski |
| 5,957,695 A | 9/1999 | Redford et al. |
| 5,959,623 A | 9/1999 | Van Hoff et al. |
| 5,959,630 A | 9/1999 | Takeuchi et al. |
| 5,960,411 A | 9/1999 | Hartman et al. |
| 5,963,916 A | 10/1999 | Kaplan |
| 5,964,836 A | 10/1999 | Rowe et al. |
| 5,966,696 A | 10/1999 | Giraud |
| 5,969,324 A | 10/1999 | Reber et al. |
| 5,971,277 A | 10/1999 | Cragun et al. |
| 5,978,773 A | 11/1999 | Hudetz et al. |
| 5,979,757 A | 11/1999 | Tracy et al. |
| 5,986,651 A | 11/1999 | Reber et al. |
| 5,992,752 A | 11/1999 | Wilz, Sr. et al. |
| 5,996,007 A | 11/1999 | Klug et al. |
| 5,996,105 A | 11/1999 | Reber et al. |
| 5,999,912 A | 12/1999 | Wodarz et al. |
| 5,999,914 A | 12/1999 | Blinn et al. |
| 6,009,407 A | 12/1999 | Garg |
| 6,009,410 A | 12/1999 | LeMole et al. |
| 6,011,537 A | 1/2000 | Slotznick |
| 6,012,083 A | 1/2000 | Savitzky et al. |
| 6,012,102 A | 1/2000 | Shachar |
| 6,021,416 A | 2/2000 | Dauerer et al. |
| 6,027,024 A | 2/2000 | Knowles |
| 6,029,141 A | 2/2000 | Bezos et al. |
| 6,031,989 A | 2/2000 | Cordell |
| 6,032,195 A | 2/2000 | Reber et al. |
| 6,035,305 A | 3/2000 | Strevey |
| 6,035,332 A | 3/2000 | Ingrassia, Jr. et al. |
| 6,038,545 A | 3/2000 | Mandeberg et al. |
| 6,044,218 A | 3/2000 | Faustini |
| 6,045,048 A | 4/2000 | Wilz, Sr. et al. |
| 6,061,659 A | 5/2000 | Murray |
| 6,064,979 A | 5/2000 | Perkowski |
| 6,065,024 A | 5/2000 | Renshaw |
| 6,078,848 A | 6/2000 | Bernstein |
| 6,081,827 A | 6/2000 | Reber et al. |
| 6,091,411 A | 7/2000 | Straub |
| 6,094,673 A | 7/2000 | Dilip et al. |
| 6,098,106 A * | 8/2000 | Philyaw et al. ............... 709/238 |
| 6,101,510 A | 8/2000 | Stone et al. |
| 6,108,656 A | 8/2000 | Durst et al. |
| 6,119,165 A | 9/2000 | Li et al. |
| 6,122,648 A | 9/2000 | Roderick |
| 6,125,388 A | 9/2000 | Reisman |
| 6,134,548 A | 10/2000 | Gottsman et al. |
| 6,138,151 A | 10/2000 | Reber et al. |
| 6,141,666 A | 10/2000 | Tobin |
| 6,144,990 A | 11/2000 | Brandt et al. |
| 6,152,369 A | 11/2000 | Wilz et al. |
| 6,154,738 A * | 11/2000 | Call ............................... 705/20 |
| 6,157,946 A | 12/2000 | Itakura et al. |
| 6,178,426 B1 | 1/2001 | Klein et al. |
| 6,189,137 B1 | 2/2001 | Hoffman |
| 6,199,048 B1 | 3/2001 | Hudetz et al. |
| 6,213,394 B1 | 4/2001 | Schumacher et al. |
| 6,223,178 B1 | 4/2001 | Himmel et al. |
| 6,243,447 B1 | 6/2001 | Swartz et al. |
| 6,247,044 B1 | 6/2001 | Gosling et al. |
| 6,314,451 B1 | 11/2001 | Landsman et al. |
| 6,314,457 B1 | 11/2001 | Schena et al. |
| 6,317,761 B1 | 11/2001 | Landsman |
| 6,339,438 B1 | 1/2002 | Bates et al. |
| 6,360,215 B1 | 3/2002 | Judd et al. |
| 6,430,554 B1 | 8/2002 | Rothschild |
| 6,434,563 B1 | 8/2002 | Pasquali et al. |
| 6,448,979 B1 | 9/2002 | Schena et al. |
| 6,457,076 B1 | 9/2002 | Cheng et al. |
| 6,490,567 B1 | 12/2002 | Gregory |
| 6,532,481 B1 | 3/2003 | Fassett, Jr. |
| 6,542,933 B1 | 4/2003 | Durst, Jr. et al. |
| 6,567,857 B1 | 5/2003 | Gupta et al. |
| 6,591,247 B2 | 7/2003 | Stern |
| 6,625,581 B1 * | 9/2003 | Perkowski ................... 705/27.1 |
| 6,865,593 B1 | 3/2005 | Reshef et al. |
| 6,925,495 B2 | 8/2005 | Hegde et al. |
| 6,959,286 B2 | 10/2005 | Perkowski |
| 6,961,712 B1 * | 11/2005 | Perkowski ................. 705/26.62 |
| 6,961,713 B2 | 11/2005 | Perkowski |
| 7,089,199 B2 | 8/2006 | Perkowski |
| 7,273,179 B2 | 9/2007 | Anson et al. |
| 7,533,040 B2 * | 5/2009 | Perkowski ................. 705/26.62 |
| 8,065,201 B2 * | 11/2011 | Perkowski ................... 705/27.1 |
| 2001/0033225 A1 | 10/2001 | RaZavi et al. |
| 2002/0128851 A1 | 9/2002 | Chefalas et al. |
| 2002/0129089 A1 | 9/2002 | Hegde et al. |
| 2002/0161672 A1 | 10/2002 | Banks et al. |
| 2003/0028483 A1 | 2/2003 | Sanders et al. |

FOREIGN PATENT DOCUMENTS

| | | |
|---|---|---|
| EP | 0645728 | 3/1995 |
| EP | 0744856 | 11/1996 |
| EP | 0822535 | 2/1998 |
| EP | 0837406 | 4/1998 |
| EP | 0856812 | 8/1998 |
| WO | WO9515533 | 6/1995 |
| WO | WO9630864 | 10/1996 |
| WO | WO9701137 | 1/1997 |
| WO | WO9707656 | 3/1997 |
| WO | WO9721183 | 6/1997 |
| WO | WO9737319 | 10/1997 |
| WO | WO9738389 | 10/1997 |
| WO | WO9803923 | 1/1998 |

| | | |
|---|---|---|
| WO | WO9806055 | 2/1998 |
| WO | WO9809243 | 3/1998 |
| WO | WO9819259 | 5/1998 |
| WO | WO9820411 | 5/1998 |
| WO | WO9820434 | 5/1998 |
| WO | WO9820440 | 5/1998 |
| WO | WO9821679 | 5/1998 |
| WO | WO9821713 | 5/1998 |
| WO | WO9824036 | 6/1998 |
| WO | WO9824049 | 6/1998 |
| WO | WO9825198 | 6/1998 |
| WO | WO9829822 | 7/1998 |
| WO | WO9834458 | 8/1998 |
| WO | WO9835297 | 8/1998 |
| WO | WO9838589 | 9/1998 |
| WO | WO9838761 | 9/1998 |
| WO | WO9851035 | 11/1998 |
| WO | WO9851036 | 11/1998 |
| WO | WO9851077 | 11/1998 |
| WO | WO9857295 | 12/1998 |
| WO | WO9858320 | 12/1998 |
| WO | WO9900756 | 1/1999 |
| WO | WO9933013 | 7/1999 |
| WO | WO0016205 | 3/2000 |
| WO | WO0016211 | 3/2000 |
| WO | WO0028455 | 5/2000 |
| WO | WO0043862 | 7/2000 |
| WO | WO0045302 | 8/2000 |
| WO | WO0050844 | 8/2000 |
| WO | WO0063780 | 10/2000 |
| WO | WO0065509 | 11/2000 |
| WO | WO0070525 | 11/2000 |
| WO | WO0101586 | 1/2001 |
| WO | WO0115019 | 3/2001 |
| WO | WO0115021 | 3/2001 |
| WO | WO0115035 | 3/2001 |
| WO | WO0139001 | 5/2001 |

OTHER PUBLICATIONS

Hunter, Jason, Introducing the new servlet API 2.1; a complete discription of what's changed since 2.0, Javaworld, Dec. 1, 1998.*
DiGiorgio et al, An instrument network for weather data on the web; Use java to display from realtime devices to web browser clients, JavaWorld, May 1, 1999.*
Draft Technical Report entitled "The Retail Store of the Future: Crest of the Third Wave" by Robert J. Corey, Ph.D. and John R. Spears, Ed.D., Jan. 15, 1997, pp. 1-45.
Excerpts from the web-based publication entitled "Introduction to JDBC.TM." by JavaSoft, circa 1999, http://java.sun.com/docs/books/dbc/intro.html, pp. 1-4.
Operating manual entitled "WEBDOX General Information Manual" by Premenos Corp., Concord, CA, 1996-1997, pp. 1-20.
Operating manual for the QRS Keystone for Retailers (1996) by QRS Corporation, www.qrs.com, pp. 1-115.
Operating manual for the QRS Keystone for Vendors (1996) by QRS Corporation, www.qrs.com, pp. 1-126.
PCT/US00/31757, 2001.
PCT/US97/19227, 1998.
Press Release entitled ""Applied Intelligence Group Inc. Announces New Product Solution that Engances its Core ViaLink Service"" by Investors Press Releases., http://www2.vialink.com/investors/press.sub.--releases/02.sub.--24.sub.--- 98.html, Feb. 24, 1998, pp. 1-2.
Product brochure entitled "The Catalog" (1996) by QuickResponse Services Corporation, www.qrs.com, pp. 1-2.
Product brochure for "NCR Web Kiosk Solutions" by NCR Corporation, www.ncr.com, 1999, pp. 1-14.
Product brochure for the Open AdStream System (OAS) by Real Media, 1995, pp. 1-9.
Product Brochure for the PREMO WEBDOX by Premenos Corporation, Concord, CA, www.premenos.com, 1997, 1 page.
Scientific article entitled "Animating the Ad" by Mark Gimein, The Industry Standard, Feb. 22-Mar. 1, 1999, pp. 1-6.
Scientific publication entitled "IDOCs.TM. Linking the Worlds of Print and Electronic Media.sup.SM" by NeoMedia Technologies, Inc., Sep. 11, 1998, pp. 1-8.
Scientific publication entitled "In-House vs. Out-Sourced Ad Serving" by Real Media, Inc., Fort Washington PA, Dec. 22, 1998, pp. 1-4.
Scientific publication entitled "Smart Catalogs and Virtual Catalogs" by Keller, Computer Sci. Dept., Stanford University, 1995, pp. 1-11.
Scientific publication entitled "World-Wide Web: The Information Universe", 1996, by Tim Berners-Lee et al., CERN, 1211 Geneva 23, Switzerland, pp. 1-8.
U.S. Appl. No. 08/691,263, filed Jan. 1, 2000, Swift et al.
Web Article entitled "E-Commerce Report: E-Tailers Fine-Tune Affiliate Sales" by Bob Tedeschi, Nov. 6, 2000, New York Times on the Web, http://www.geoffclendenning.com/NYTimes.sub.--press.htm.
Web article entitled "e-Pod Bundles with DoubleClick", AdWeekOnline Interactive News, Jun. 15, 2000, http://www.geoffclendenning.com/Adweek%20Online.htm.
Web article entitled "Macromedia Takes Stake in ePod" by Pamela Parker, Jul. 5, 2000, http://www.clickz.com/news/article/php/408081.
Web article entitled "NBCi Signs 3-Tier Deal to Plug ePod Showcase" by Ann M. Mack, 2001, AdweekOnline, http://www.geoffclendenning.com/Adweek%20Online2.htm.
Web article entitled "New Ad Vehicle Fights the Banner Ad Clickthrough Dilemma" by Ann M. Mack, May 22, 2000, Brandweek, http://www.findarticles.com/p/articles/mi.sub.--m0BDW/is.sub.--21.sub.--4- 1/ai.sub.--62661555.
Web-based product brochure for "Home Network Enliven Services" by Enliven Services, http://www.enliven.com/products/prodinfo.htm, 1999, pp. 1-8.
Web-based product brochure for "Thinking Media ActiveAds" by Thinking Media, http://thethinkingmedia.com/activeads/index.html, 1999, 1 page.
Web-based product brochure for the Synclink Item Catalog by Vialink, Inc., http://www.vialink.com/products/products-catalog.html, 1 page.
Web-based technical report entitled "Amended Annual Report (10KSB) for Applied Intelligence Group, Inc." http://www.edgar-online.com, Mar. 28, 1997, pp. 1-55.

* cited by examiner

*Primary Examiner* — Mark Fadok
(74) *Attorney, Agent, or Firm* — Thomas J. Perkowski, Esq., PC

(57) ABSTRACT

Method of and system for delivering consumer product related information to consumers over the Internet. The system and method involves creating a Consumer Product Information (CPIR) enabling object for each consumer service registered within a service-provider managed database management system. The HTML tag associated with each CPIR-enabling object is encapsulated within an executable file and then stored in the database management system. Each CPIR-enabling object is searchable and its HTML tag downloadable and then embedded within an HTML-encoded document. Upon encountering the HTML document, the underlying CPIR-enabling object is automatically executed on an object-oriented server, causing a service-directed search to be performed against the database management system, and the results thereof, from one or more Web-based product information servers, displayed in an independent GUI, without disturbing the consumer's point of presence on the WWW.

21 Claims, 24 Drawing Sheets

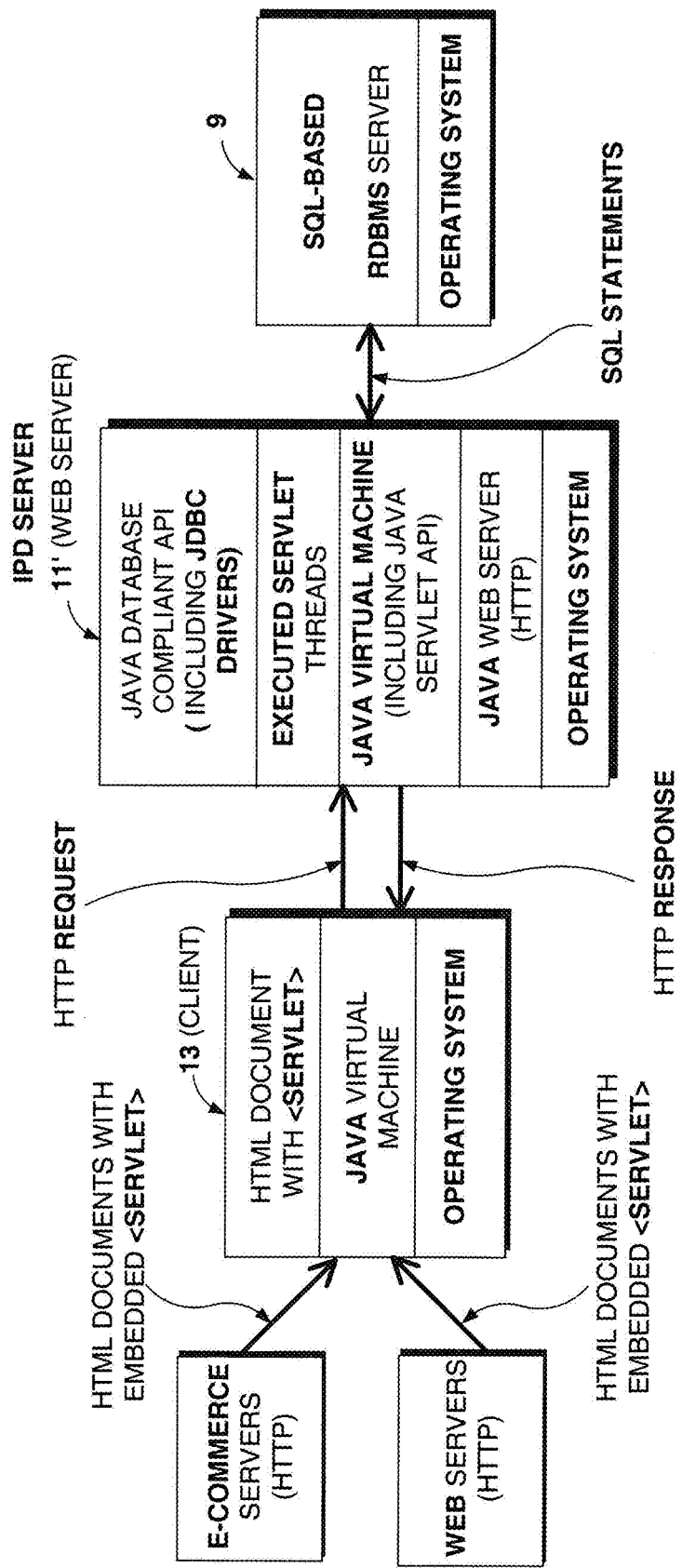
FIG. 2B1

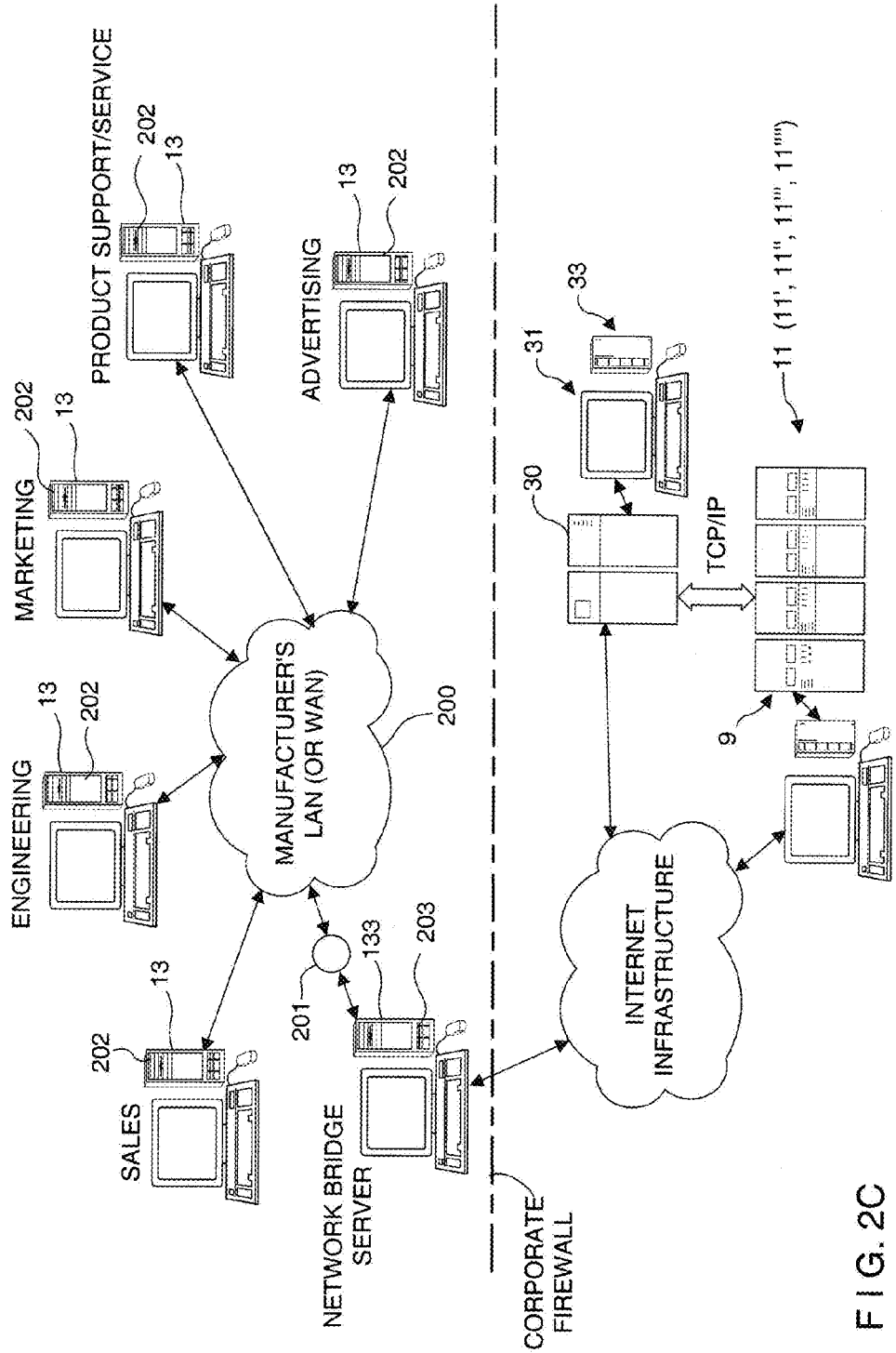

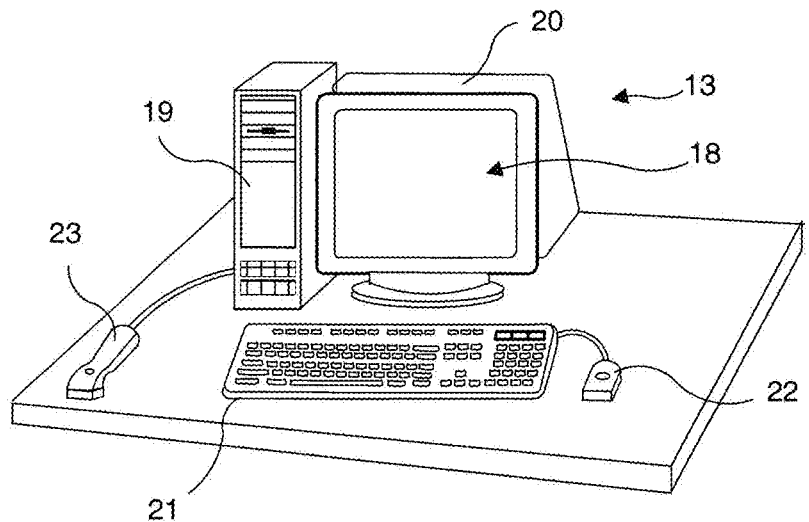
FIG. 3A1
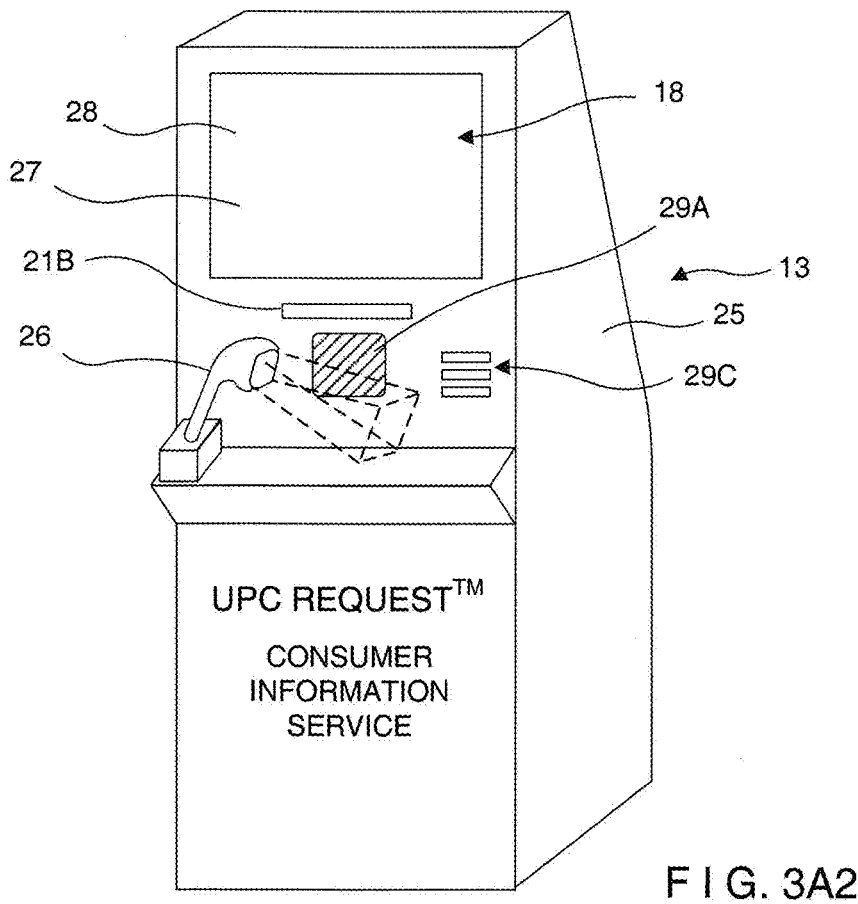
FIG. 3A2

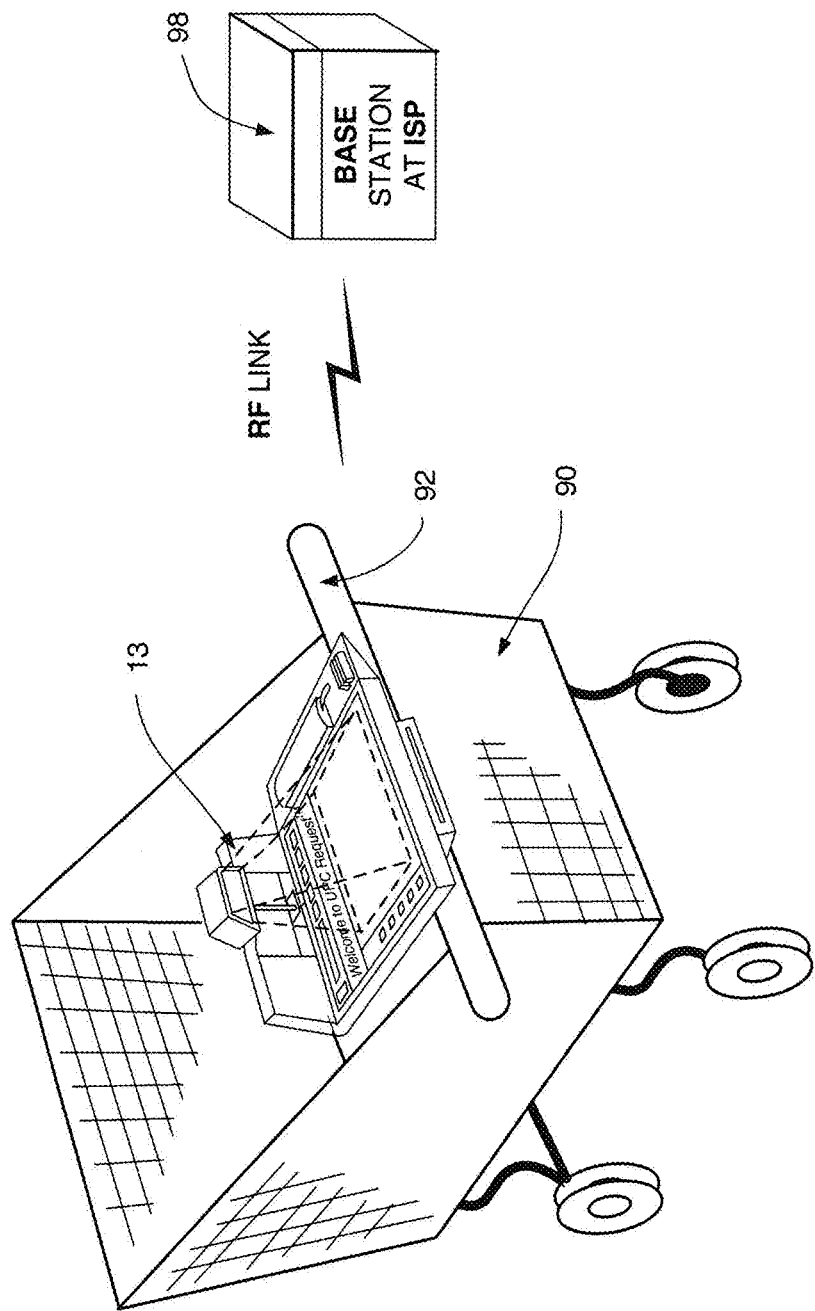
FIG. 3A3

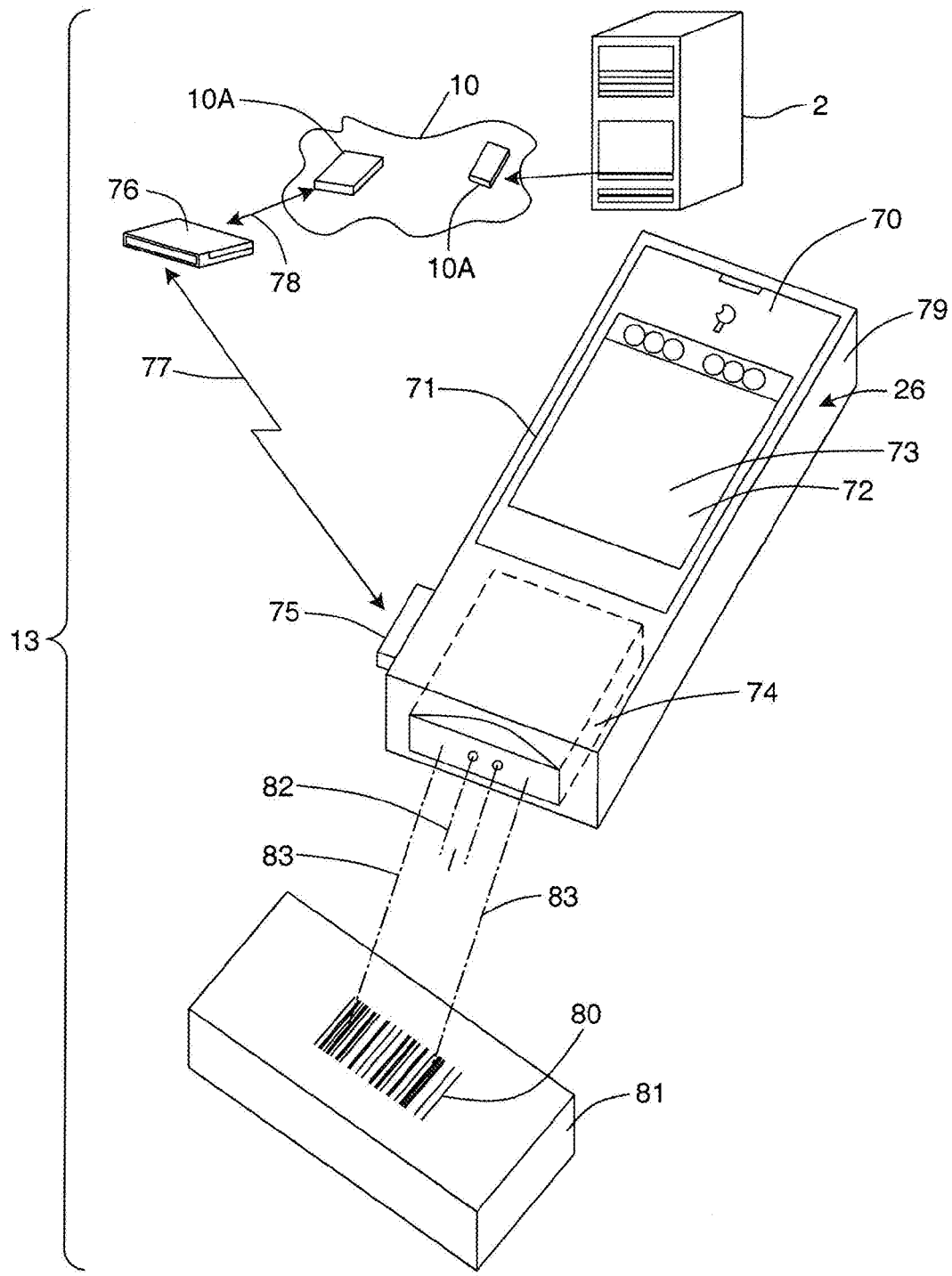
F I G. 3A4

| IP / SN | REGISTRANT'S NAME AND ADDRESS | PRODUCT DESCRIPTION | UNIFORM RESOURCE LOCATOR (URL) | TRADE/ SERVICE MARKS | e-mail ADDRESS | CPIR APPLETS | STATUS |
|---|---|---|---|---|---|---|---|
| 7/18908/17674/0 | APPLE COMPUTER, INC. CUPERTINO, CA. | POWER MAC 7600/120 COMPUTER | http://www.power.com/pc | POWER MAC | | | |
| 0/373/100/6 | PROCTOR & GAMBLE | TOOTH PASTE | http://www.tooth.com/pc | CREST | | | |
| 3/12547/68404/0 | WARNER WELCOME | ACID REDUCER | http://www.zantac.com/pc | ZANTAC ZANTAC 75 | | | |
| | | | | | | | |
| 0/00005/17643/4 | KODAK, INC. | FILM PROCESSING | http://www.kodak.com/pc | KODAK | | | |
| | | | | | | | |
| ... | ... | ... | ... | ... | ... | ... | ... |
| 0/27242/51057/9 | SONY, INC. | PERSONAL COMPUTER | http://www.sony.com/pc | SONY | | | |

CONSUMER PRODUCT INFO. REQUEST, CPIR-ENABLING APPLET LIBRARY

F I G. 4A1

| URL$_1$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLANEOUS INFORMATION FIELD | PRODUCT ADVERTISEMENT INFORMATION FIELD |
|---|---|---|---|---|---|---|---|
|  |  |  |  |  |  |  |  |
|  |  |  |  |  |  |  |  |
| ... | ... | ... | ... | ... | ... | ... | ... |
|  |  |  |  |  |  |  |  |

FIG. 4A2

| I P / S N | REGISTRANT'S NAME AND ADDRESS | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| | | | | | |
| 0/30000/01020/4 | QUAKER, INC. | OATMEAL | QUAKER | | |
| 0/496/390/1 | COLA COLA, INC. | COCA SODA | COCA - COLA, COKE | | |
| 0/7599/24245/2 | WARNER BROS. | PAT METHANY AUDIO CD | GEFFEN | | |
| | | | | | |
| ... | ... | ... | ... | ... | ... |
| | | | | | |

| Consumer Product |
|---|
| UPC Number |
| Company Name |
| Manufacturer ID Number |
| Manufacturer Product Number |
| Manufacturer Website URL |
| Product Description |
| Primary Trademark |
| Secondary Trademark |
| Package Type |
| UPC Symbol Type |
| Website Marking on Package |
| 800 Consumer Phone Number |

FIG. 4C2

| Info. Resources on WWW |
|---|
| UPC Number |
| Manufacturer ID Number |
| Manufacturer Product Number |
| Company Name |
| URL For Product Description |
| URL For Product Manual |
| URL For Warranty Service |
| URL For WWW Advertisement |
| URL For WWW Advertisement |
| URL For WWW Advertisement |
| URL For Product Wholesaler |
| URL For Product Wholesaler |
| URL For Product Wholesaler |
| URL For Product Retailer No.1 |
| URL For Product Retailer No.2 |
| URL For Product Retailer No.3 |
| URL For Direct Product Purchase |
| URL For Complementary Product |
| URL For Complementary Product |
| URL For Complementary Product |
| URL For Company Annual Report |
| URL For Company Stock Purchase |

FIG. 4C3

| RETAILER |
|---|
| Company Name |
| Street Address |
| City |
| State |
| Postal Code |
| Country |
| Manufacturer ID Number |
| Contact Person |
| Phone Number |
| E-Mail |
| Domain Name |
| Website Creation Date |
| Website Existence |
| Manufacturer Website URL |
| Manufacturer No. 1 |
| Manufacturer No. 2 |
| Manufacturer No. 3 |
| Manufacturer No. 4 |
| Manufacturer No. 5 |
| Manufacturer No. 6 |
| Manufacturer No. 7 |
| Manufacturer No. 8 |
| Manufacturer No. 9 |
| Manufacturer No. 10 |
| ⋮ |
| Manufacturer No. N |

FIG. 4D

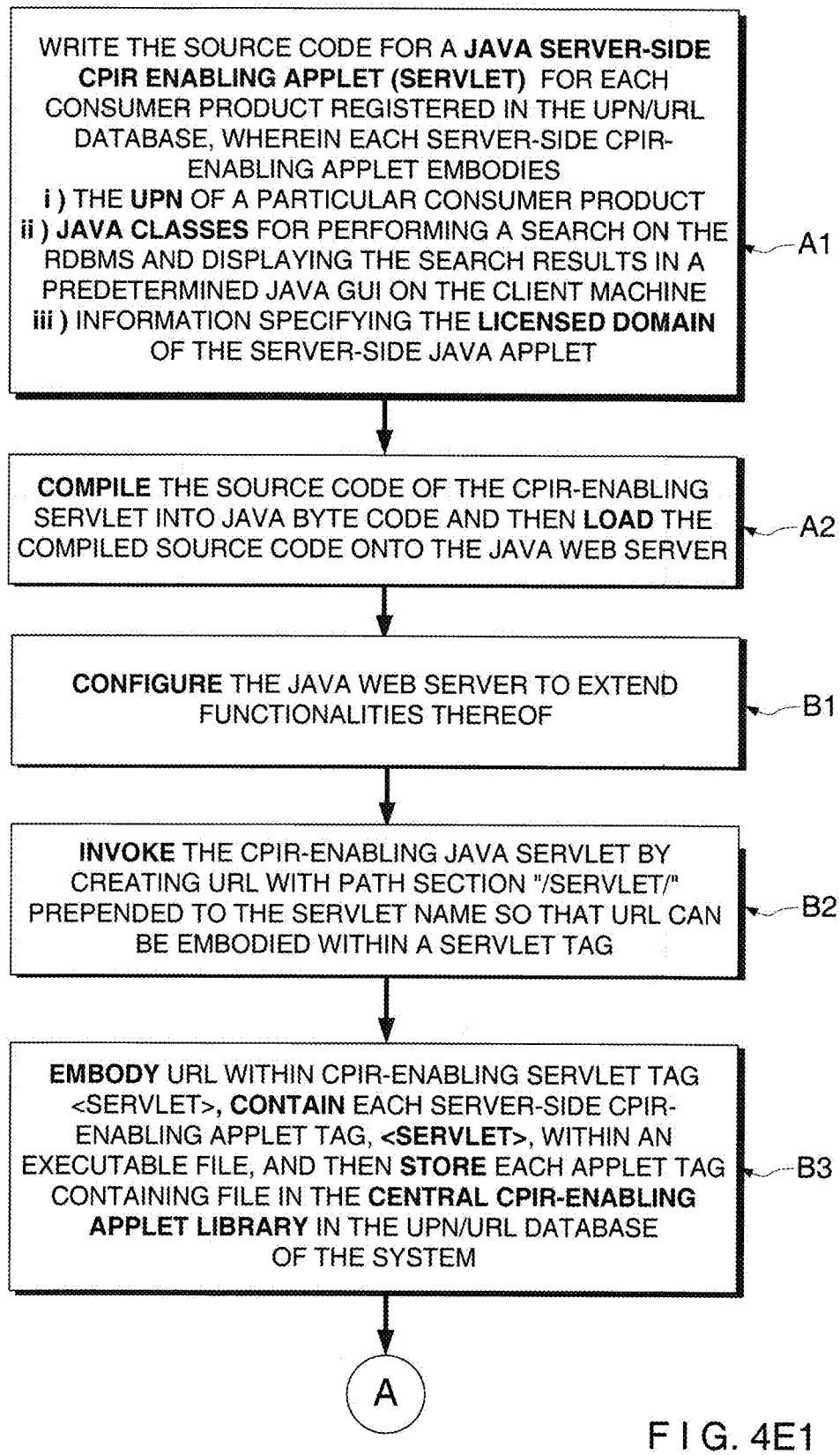
FIG. 4E1

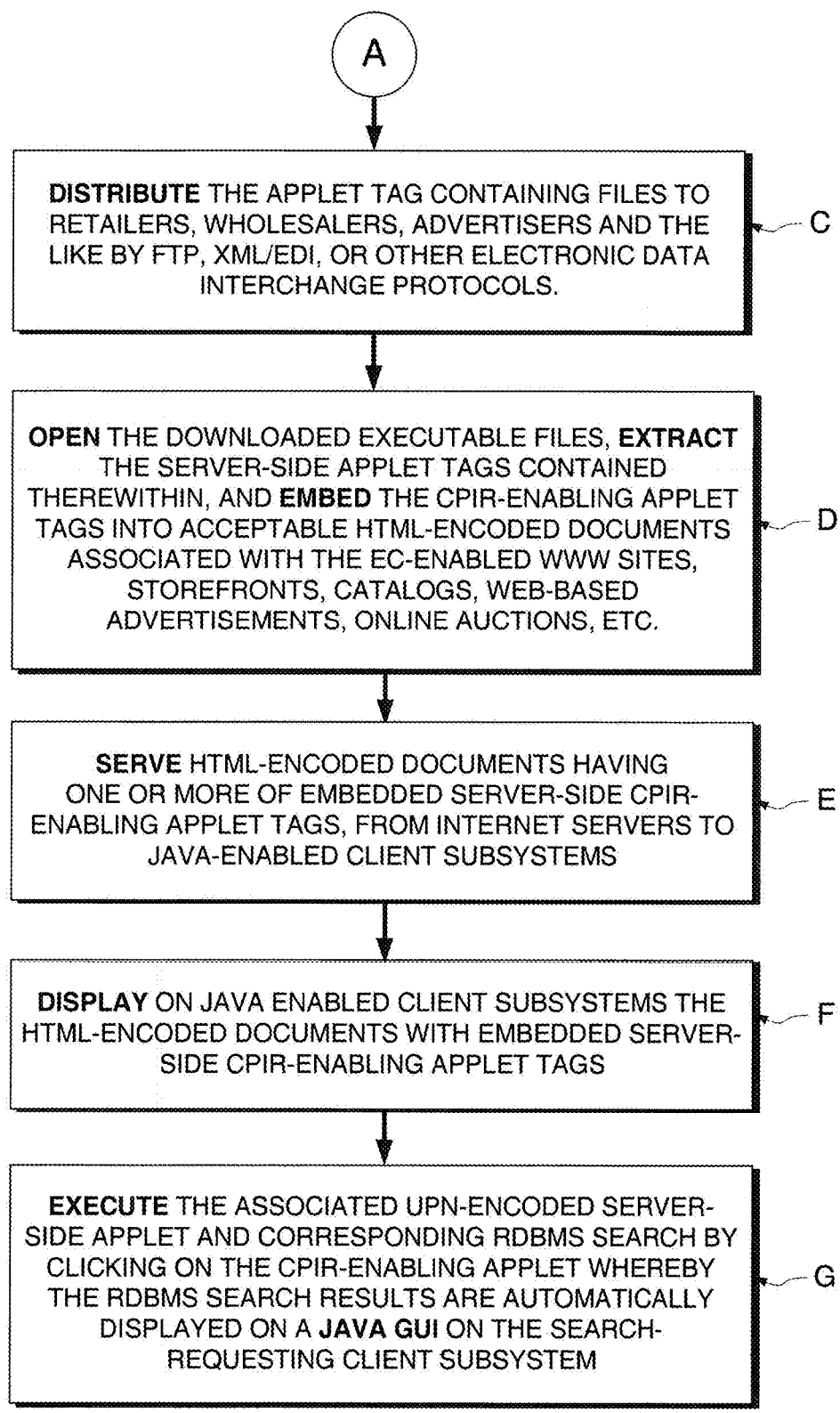
FIG. 4E2

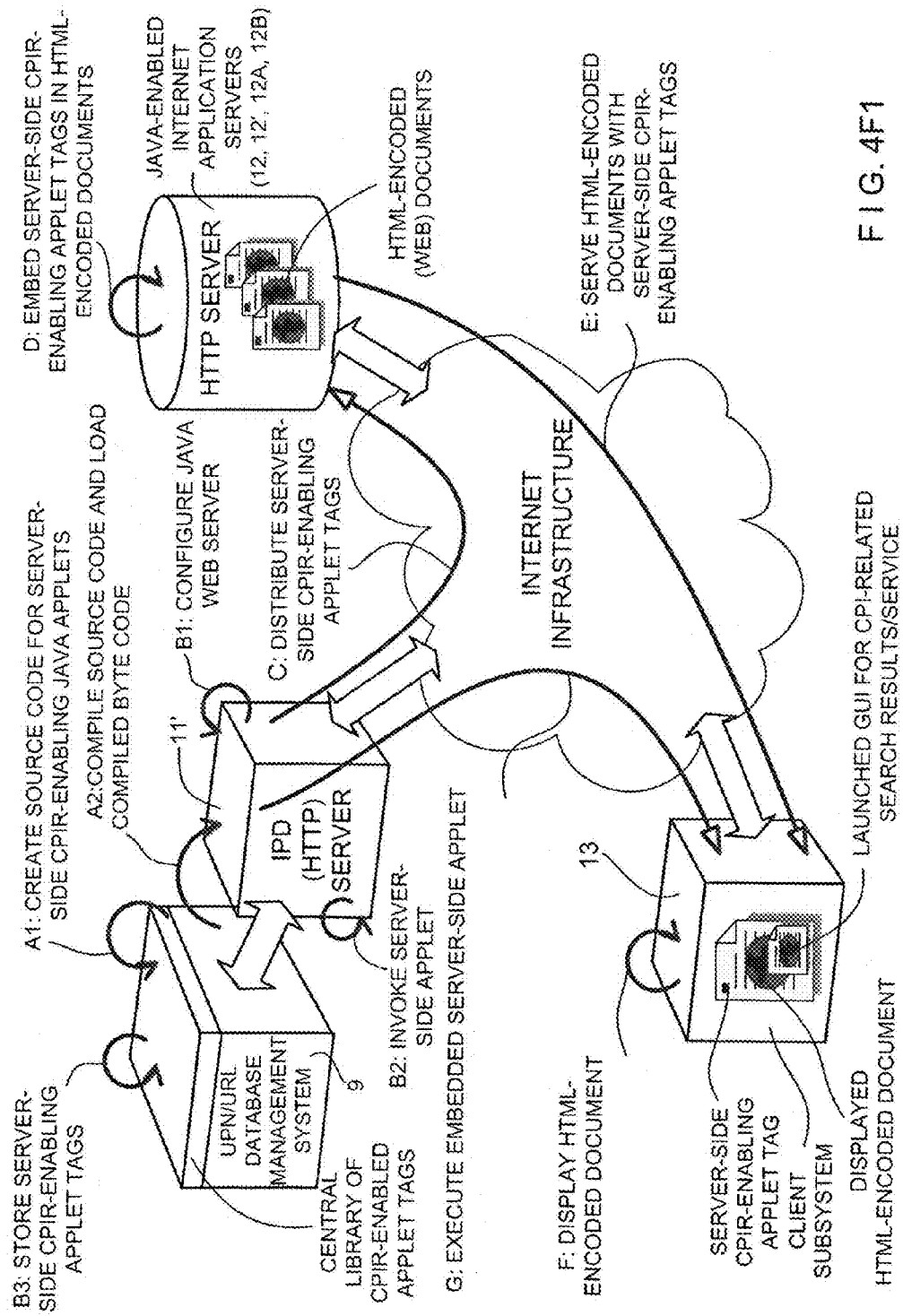

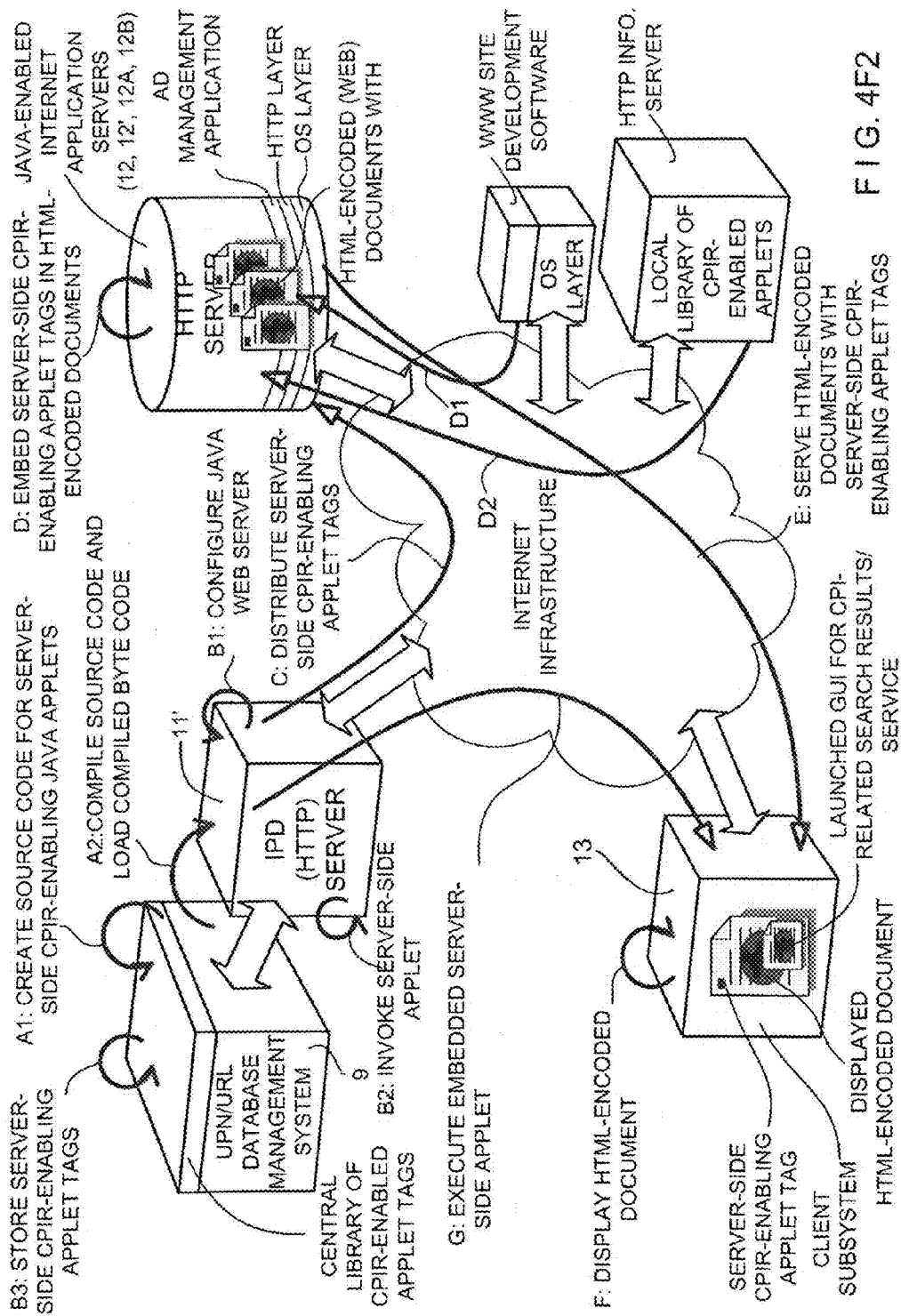
FIG. 4F2

INTERNET-BASED METHOD OF AND SYSTEM FOR MANAGING AND DELIVERING CONSUMER PRODUCT INFORMATION AT POINTS ALONG THE WORLD WIDE WEB USING CONSUMER PRODUCT INFORMATION (CPI) REQUESTING AND GRAPHICAL USER INTERFACE (GUI) DISPLAYING SUBSYSTEMS DRIVEN BY SERVER-SIDE OBJECTS AND MANAGED BY CONSUMER PRODUCT MANUFACTURERS AND/OR AUTHORIZED PARTIES

RELATED CASES

This application is a Continuation of U.S. application Ser. No. 12/454,031 filed May 11, 2009 now U.S. Pat. No. 8,065,201; which is a Continuation of U.S. application Ser. No. 11/261,415 filed Oct. 28, 2005, now U.S. Pat. No. 7,533,040; which is a Continuation of U.S. application Ser. No. 09/441,973 filed Nov. 17, 1999, now U.S. Pat. No. 6,961,712; which is a Continuation-in-Part of application Ser. No. 09/284,917, now abandoned; which was entered into the U.S. on Apr. 21, 1999 which is a National Stage Entry Application from International Application No. PCT/US97/19227 filed Oct. 27, 1997, published as WIPO Publication No. WO 98/19259 on May 7, 1998; as well as a Continuation-in-Part of the following U.S. application Ser. No. 08/736,798 filed Oct. 25, 1996, now U.S. Pat. No. 5,918,214; Ser. No. 08/752,136 filed Nov. 19, 1996, now U.S. Pat. No. 6,064,979; Ser. No. 08/826,120 filed Mar. 27, 1997, now abandoned; Ser. No. 08/854,877 filed May 12, 1997, now U.S. Pat. No. 5,950,173; Ser. No. 08/871,815 filed Jun. 9, 1997 now U.S. Pat. No. 7,143,055; and Ser. No. 08/936,375 filed Sep. 24, 1997, now abandoned; each said Application is commonly owned by IPF, Inc., and is incorporated herein by reference in its entirety as if fully set forth herein.

BACKGROUND OF INVENTION

1. Field of Invention

The present invention generally relates to a novel system and method for collecting consumer-product related information and transmitting and delivering the same along the consumer-product supply and demand chain using the International Information Infrastructure (e.g. the Internet), and more particularly to a novel system and method for delivering consumer product related information to consumers within retail environments using Internet-based information servers and sales agents.

2. Brief Description of the Prior Art

Dissemination of consumer-product information between manufacturers and their retail trading partners must be accurate and timely. The traditional methods of phone calls and faxes are time consuming and resource intensive. An electronic Universal Product Code (UPC) Catalog (i.e. database system), accessible 24 hours a day, is a solution. In 1988, QuickResponse Services (QRS), Inc. Of Richmond, Calif., introduced the first independent product information database, using the retail industry standard UPC numbering system. Today the QRSolutions™ Catalog contains information on over 52 million products from over 1500 manufacturers. The QRSolutions Catalog is a Windows-based application providing a critical information flow link between the retailers and the manufacturers along the supply and demand chain.

After assigning a UPC number to each item, the manufacturer organizes and sends the data via an electronic data interchange (i.e. EDI) transmission, or a tape, to QRS, Inc. to be loaded into the UPC Catalog database. Changes to the data can be made on a daily basis. Retailers with access to a manufacturer's data can view and download the data once it has been added or updated. Automatic update capabilities ensure the most recent UPC data will be in the EDI mailbox of each retail customer quickly.

The effect of a centralized database such as QRS's UPC Catalog improves the flow of merchandise from the manufacturer to the retailer's selling floor and ultimately to the consumer. With the UPC Catalog, accurate, up-to-date product information is available when the retailer needs it, eliminating weeks from the order cycle time.

In addition to the electronic UPC-based product information subsystem (i.e. UPC Catalog) described above, a number of other information subsystems have been developed for the purpose of providing solutions to problems relating to electronic commerce (EC) merchandising and logistics within the global supply chain. Such ancillary information subsystems include, for example: (i) Sales, Analysis and Forecasting Subsystems for producing and providing retailers with information about what products consumers are buying; (ii) Collaborative Replenishment Subsystems for determining what products retailers can buy in order to satisfy consumer demand at any given point of time; and (iii) Transportation and Logistics Information Subsystems for producing and providing retailers with information about when products purchased by them (at wholesale) will be delivered to their stores. Typically, such information subsystems are connected to various value added information networks in order to efficiently offer such information services to retailers on a global basis.

While the above-described information systems collectively cooperate to optimize the process of moving raw materials into finished products and into the hands of consumers, such information systems fail to address the information needs of the consumers of retail products who require and desire product-related information prior to, as well as after, the purchase of consumer-products. Moreover, prior art demand chain management systems operate in an open-loop mode with a "break" in information flow cycle, disabling the manufacturers from communicating with the consumers in an efficient manner to satisfy consumer needs.

Presently, an enormous amount of time, money and effort is being expended by companies in order to advertise and sell their products and services, and to provide product related information, product warranty service and the like after product purchase has taken place. Various types of media for decades have been used to realize such fundamental business functions.

In recent times, there have been a number of significant developments in connection with the global information network called the "Internet", which has greatly influenced many companies to create multi-media Internet Web-sites in order to advertise, sell and maintain their products and services. Examples of such developments include, for example: the World Wide Web (WWW) based on the Hypertext Markup Language (HTML) and the Hypertext Transmission Protocol (HTTP) by Tim Berners-Lee, et al. (See "World-Wide Web: The Information Universe" by Tim Berners-Lee, et al; easy to use Java GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modeling Language (VRML) by Mark Pecse. Such developments in recent times have made it very easy for businesses to create 2-D Hypermedia-based Home Pages and 3-D VR Worlds (i.e. 3-D Websites) for the purpose of projecting a desired "corporate image" and providing a backdrop for financial investment solicitation, as well as product advertising, sales and maintenance operations.

Presently, a person desiring to acquire information about any particular product has a number of available search options. In particular, he or she may attempt to directly contact the manufacturer, wholesaler or reseller by telephone, US mail, e-mail, or through the company's World Wide Web (WWW) site, if they have one. In the event one decides to acquire product information through the seller's WWW site, he or she must first determine the location of its WWW site (i.e. Internet address) which oftentimes can involve using Internet Search engines such as Yahoo®, AltaVista™, WebCrawler™, Lycos™, Excite™, or the like. This can be a very time consuming process and can sometimes lead to a dead end. Once the Internet address is obtained, one must then review the home page of the company's Web-site in order to find where information about a particular product resides on the Website, if it so exists. This search process can be both time consuming and expensive (in terms of Internet time) and may not turn up desired information on the product of interest.

In some instances, product brochures bear a preprinted Internet address designed to direct or point prospective customers to a particular Web-site where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product related information on the Internet, it is not without its shortcomings and drawbacks.

In particular, when a company improves, changes or modifies an existing Web-site which publishes product and/or service advertisements and related information, it is difficult (if not impossible) not to change the Internet locations (e.g. Web addresses) at which such product and/or service advertisements and related information appear. Whenever a company decides or is forced to change any of its advertising, marketing and/or public relations firms, there is a substantial likelihood that new Web-sites will be created and launched for particular products and services, and that the Web addresses of such new Web-sites will no longer correspond with the Web addresses on preprinted product brochures currently in circulation at the time. This can result in pointing a consumer to erroneous or vacant Web-sites, that present either old or otherwise outdated product and/or service information, possibly adversely influencing the consumer's purchasing decision.

Moreover, when a company launches a new Web-site as part of a new advertising and marketing campaign for a particular product, any preprinted advertising or marketing material relating to such products will not reflect the new Web-site addresses which the campaign is promoting. This fact about preprinted advertising media renders it difficult to unify new and old advertising media currently in circulation into an advertising and marketing campaign having a coherent theme. In short, the inherently static nature of the "preprinted Web address" pointing technique described above is wholly incapable of adjusting to the dynamic needs of advertising, marketing and public relations firms alike.

Recently, two different methods have been proposed for providing product information to consumers over the Internet.

U.S. Pat. No. 5,640,193 to Wellner discloses a system and method for accessing and displaying Web-based consumer product related information to consumers using an Internet-enabled computer system, whereby in response to reading a URL-encoded bar code symbol on, or associated with a product, the information resource specified by the URL is automatically accessed and displayed on the Internet-enabled computer system. While this system and method enables access of consumer product information related information resources on the WWW by reading URL-encoded bar code symbols, it requires that custom URL-encoded bar code symbols be created and applied to each and every consumer product in the stream of commerce.

U.S. Pat. No. 5,978,773 to Hudetz, et al discloses a solution to the problem presented by the system and method of U.S. Pat. No. 5,640,193, by proposing the use of a UPC/URL database in order to translate UPC numbers read from consumer products by a bar code scanner, into the URLs of published information resources on the WWW relating to the UPC-labeled consumer product.

While U.S. Pat. No. 5,978,773 provides an effective solution to the problem presented by U.S. Pat. No. 5,640,193, it completely fails to recognize or otherwise address the myriad of problems relating to UPC/URL-link collection, management, delivery, access and display along the retail supply and demand chain, which the system and method of U.S. Pat. No. 5,978,773 presents and must be first solved in order to deliver a technically feasible, globally-extensive, UPC-driven consumer product information system for the benefit of consumers worldwide.

Thus, it is clear that there is great need in the art for an improved Internet-based method of and system for delivering product related information to the consumers along the entire retail supply and demand chain, while avoiding the shortcomings and drawbacks of prior art systems and methodologies.

DISCLOSURE OF THE INVENTION

Accordingly, a primary object of the present invention is to provide a novel method and apparatus for collecting product-related information and transmitting and delivering the same between the manufacturers and retailers of products to the consumers thereof in retail shopping environments as well as at home, work and on the road, while overcoming the shortcomings and drawbacks of prior art systems and methodologies.

Another object of the present invention is to provide such an apparatus in the form of a novel consumer-product information collection, transmission and delivery system.

Another object of the present invention is to provide such a system with an Internet-based product information database subsystem which, for each commercially available consumer-product, stores a number of information elements including: the name of the manufacturer; the Universal Product Code (UPC) assigned to the product by the manufacturer; one or more URLs specifying the location of information resources (e.g. Web-pages) on the Internet relating to the UPC-labeled consumer-product; and the like.

Another object of the present invention is to provide such a system, in which the URLs stored in the Internet-based product information database are categorically arranged and displayed according to specific types of product information (e.g., product specifications and operation manuals; product wholesalers and retailers; product advertisements and promotions; product endorsements; product updates and reviews; product warranty/servicing; related or complementary products; product incentives including rebates, discounts and/or coupons; etc.) that relate to the kind of information required, desired or otherwise sought by consumers, wholesalers, retailers and/or trading partners; product prices at which the products are being offered for sale by a particular retailer; and the like.

Another object of the present invention is to provide such a system, wherein the information maintained within the Internet-based product information database management subsystem provides a manufacturer-defined consumer-product directory that can be used by various persons along the retail supply and demand chain.

Another object of the present invention is to provide such a system, wherein the manufacturers of consumer-products are linked to the retailers thereof in the middle of the supply and demand chain by allowing either trading partner access to consumer-product information from the Internet-based product information database virtually 24 hours a day, seven days a week.

Another object of the present invention is to provide such a system, wherein consumer-product manufacturers, their advertisers, distributors and retailers are linked to the consumers of such products at the end of the supply and demand chain, by allowing such parties access to consumer-product information from the Internet-based product information database subsystem virtually 24 hours a day, seven days a week.

Another object of the present invention is to provide a novel system and method for finding and serving consumer-product related information on the Internet.

Another object of the present invention is to provide a novel method of carrying out electronic-type commercial transactions involving the purchase of products which are advertised on the Internet at uniform resource locations (URLs) that are registered with the IPI system of the present invention.

Another object of the present invention is to provide a novel method of and system for accessing consumer product related information at points within HTML-encoded documents, at which Universal Product Number (UPN) encoded Java Applets are embedded so as to produce, when executed, a consumer product information display enabling ("CPID-enabling") Java-based graphical user interfaces (GUIs) for the convenience of consumers shopping at electronic-commerce (EC) enabled stores, considering the placement of bids at on-line auction sites, or browsing product advertisements appearing on the World Wide Web.

Another object of the present invention is to provide an Internet-based consumer product information collection, management and delivery system and method, wherein for each consumer product registered within the UPN/URL database of the system, an interactive consumer product information request (CPIR) enabling Applet (e.g. based on Java™ component principles or MicroSoft's Active-X technology) is created and stored which, when executed upon the initiation of the consumer through a mouse-clicking operation, automatically causes a preassigned CPID-enabling Java GUI to be displayed at the consumer's point of presence in Cyberspace, revealing the results of a consumer product information display conducted upon the product identified by the UPN encoded within the executed Applet.

Another object of the present invention is to provide such an Internet-based consumer product information collection, management and delivery system and method, wherein (1) the UPN assigned to a particular consumer product by the manufacturer and (2) the URL of the Java script running on the IPD server of the system are encoded within the CPIR-enabling Applet so that, upon execution of the Applet, a consumer product information display (CPID) Java GUI is automatically produced for the consumer's convenience.

Another object of the present invention is to provide an Internet-based consumer product information collection, management and delivery system and method, wherein the CPID-enabling Java GUI automatically displays a manufacturer-defined menu (i.e. list) of categorized URLs pointing to information resources on the Internet (e.g. WWW) relating to the consumer product identified by the UPN encoded within the CPIR-enabling Applet.

Another object of the present invention is to provide such an Internet-based consumer product information collection, management and delivery system and method, wherein CPIR-enabling Applets are created by the system administrator, loaded within the UPN/URL database management subsystem thereof, distributed to retailers, wholesalers, manufacturers, advertisers and others for embedding within HTML-encoded documents associated with EC-enabled stores, catalogs, Internet-based product advertisements, on-line auction sites, and other locations on the WWW where accurate consumer product related information is desired or required without leaving the point of presence on the WWW at which the consumer resides.

Another object of the present invention is to provide such an Internet-based consumer product information collection, management and delivery system and method, wherein CPIR-enabling Applets are created, distributed, and embedded within a HTML-encoded document related to a particular consumer product, and subsequently executed by a consumer so as to access and display a manufacturer-defined menu (i.e. list) of categorized URLs pointing to product-related Web-documents.

Another object of the present invention is to provide such an Internet-based consumer product information collection, management and delivery system and method, wherein the consumer initiating the execution of a particular CPIR-enabling Applet may be anyone desiring or requiring consumer product related information while interacting with the communication medium provided by the Internet and its supported technologies (e.g. WWW, EC, etc.). As such, the consumer may be a student shopping at an EC-enabled (business-to-consumer) retail store for textbooks, a retail purchasing agent shopping at an on-line (business-to-business) wholesale product catalog for product inventory, a dealer looking to purchase a new or used product listed at an on-line auction site, or anyone encountering an Internet-based advertisement while surfing the WWW.

Another object of the present invention is to provide such an Internet-based consumer product information collection, management and delivery system and method, wherein a thumb-nail picture, arbitrary graphical object, predesignated CPIR-indicating icon, or hypertext-type link associated with a particular consumer product can be embedded within the CPIR-enabling Applet associated therewith, so as to enable the consumer to produce a CPID-enabling Java GUI upon encountering the same in an HTML-encoded document on the WWW.

Another object of the present invention is to provide such an Internet-based consumer product information collection, management and delivery system and method, wherein licensed users can download CPIR-enabling Applets from the CPIR-Enabling Applet Library to any client computer for eventual insertion within the HTML code of a particular Web-document to be published on the Internet in accordance with the licensing arrangement between the contracting parties. Such end-use applications might be in EC-enabled retail product catalogs, EC-enabled wholesale/trade catalogs, Internet-based product advertisements, and the like.

Another object of the present invention is to provide such an Internet-based consumer product information collection, management and delivery system and method, wherein the CPID-enabling Java GUIs enabled by executed CPIR-enabling Applets can function as CPI-serving "cyber-kiosks" that can be installed at any location in Cyberspace for the convenience of consumers residing therewithin without disturbing their point of presence.

Another object of the present invention is to provide a novel method of and system for delivering consumer product advertisements and consumer product related information to consumers over the WWW involving the use of a single mouse-clicking operation by the consumer.

Another object of the present invention is to provide a novel method of and system for embedding CPIR-enabling Applets within HTML-encoded consumer product advertisements published over the WWW involving the use of a single mouse-clicking operation by the consumer.

Another object of the present invention is to provide a novel method of and system for delivering consumer product related information to consumers at on-line auction sites on the WWW involving the use of a single mouse-clicking operation by the consumer. Another object of the present invention is to provide a novel method of and system for embedding CPIR-enabling Applets within HTML-encoded on-line auction pages published over the WWW.

Another object of the present invention is to provide a new method of and system for purchasing a consumer product over the Internet (e.g. WWW) comprising the steps of: embedding a UPN-encoded CPIR-enabling Applet within the HTML-code of a consumer product advertisement, wherein the CPIR-enabling Applet when executed displays a categorized URL menu containing one or more URLs pointing to one or more EC-enabled stores or on-line catalogs on the WWW at which the consumer product identified by the encoded UPN can be purchased and delivered to a particular address in physical space.

Another object of the present invention is to provide a novel cyber-kiosk, launchable from predefined points of presence within an EC-enabled store, on-line product catalog or other type of WWW site, for enabling consumers (including retail purchasing agents) to quickly access and display at the predefined point of presence, an interactive menu of categorized URLs pointing to consumer product related information resources published on the WWW and symbolically linked to the UPNs of consumer products within a centralized UPN/URL database management subsystem, by manufacturers and/or their agents.

Another object of the present invention is to provide a novel EC-enabled product catalog having a library of CPIR-enabling Applets embeddable within graphical images of consumer products in HTML-encoded documents and enabling, when executed, a UPN-directed search within the UPN/URL database management subsystem and the display of an interactive menu of categorized URLs pointing to consumer product related information resources published on the WWW and symbolically linked to the UPNs of consumer products within a centralized UPN/URL database management subsystem, by manufacturers and/or their agents.

Another object of the present invention is to provide a novel Internet-based electronic commerce (EC) enabled shopping system comprising an Internet information server connected to the infrastructure of the Internet and supporting the hypertext transmission protocol (http), a Web-enabled client subsystem connected to the infrastructure of the Internet, an EC-enabled WWW site comprising a plurality of interlinked HTML-encoded documents arranged and rendered to provide an electronic store environment when served to a consumer operating the Web-enabled client subsystem, wherein the electronic store environment presents a plurality of products for purchase and sale by an EC-enabled payment method supported over the Internet.

Another object of the present invention is to provide such an Internet-based electronic commerce (EC) enabled shopping system, wherein a Java Applet tag, associated with each product, is embedded within at least one of the HTML-encoded documents displayed on the Web-enabled client subsystem, and each Java Applet tag is associated with a Java Applet encoded with the universal product number (UPN) assigned to one of the products, and, when the consumer selects one of the Java Applet tags, the associated Java Applet is automatically executed enabling a search to be conducted against a product information database hosted on an Internet database server connected to the Internet, from which the results of the UPN-specified search are automatically displayed in a GUI served to the Web-enabled client subsystem.

Another object of the present invention is to provide client-side and server CPIR-enabling Java Applets for enabling the consumer product information searches at virtually any consumer point of presence on the WWW by performing a single mouse-clicking operation.

These and other objects of the present invention will become apparent hereinafter and in the Claims to Invention.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, wherein:

FIGS. 2-1 and 2-2 depict a schematic diagram of the consumer-product information collection, transmission and delivery system of the illustrative embodiment hereof shown embedded with the infrastructure of the global computer communications network known as the "Internet", and comprising a plurality of data-synchronized Internet Product Directory (IPD) Servers connected to the infrastructure of the Internet, a UPN/URL Database Subsystem (i.e. UPN/URL Database) connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogues of manufacturers, a plurality of retailer-related electronic-commerce (EC) information servers for hosting EC-enabled stores or EC-enabled on-line catalogues of retailers, a plurality of Internet Product-Information (IPI) Servers connected to the infrastructure of the Internet for serving consumer-product related information to consumers in retail stores and at home, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers;

FIG. 2B1 is a block schematic diagram of the IPD Server of the first illustrative embodiment, showing its subsystem components, namely: a relational database management subsystem (RDBMS) server and a Java Web Server with Java servlet support, being accessed by a Java-enabled client machine seeking to access consumer product related information from the RDBMS server using server-side Java Applets whose HMTL tags are embedded within HTML-encoded documents served to the client machine from any one of a number of potential http information servers on the Internet;

FIG. 2C is a schematic representation of a portion of the system shown in FIGS. 2-1 and 2-2, wherein a plurality of manufacturer-operated client subsystems are shown connected to a local or wide area IP-based network, preferably maintained behind a secure corporate firewall, and the secured manufacturer information network is connected to the infrastructure of the Internet by way of an Internet router and server, for the purpose of enabling different departments within a business organization (e.g. marketing, sales, engineering, support and service, advertising, finance, etc.) to manage different types of UPN/URL links based upon the type of information contained within the URL-specified information resource on the WWW;

FIG. 3A1 is a graphical representation of a first illustrative embodiment of the client computer system of the present invention, designed for use in desktop environments at home, work and play;

FIG. 3A2 is a graphical representation of a second illustrative embodiment of the client computer system of the present invention realized in the form of a bar code driven multi-media kiosk, designed for use as a "virtual or Cyber sales agent" in retail shopping environments, such as department stores, supermarkets, superstores, retail outlets and the like;

FIG. 3A3 is a graphical representation of a seventh illustrative embodiment of the client computer system of the present invention realized in the form of a bar code driven multi-media kiosk, mounted upon a shopping cart or other vehicle for shopping convenience in retail environments such as department stores, supermarkets, superstores, retail outlets and the like;

FIG. 3A4 is a schematic representation of another embodiment of the transportable bar code driven product information access terminal of the present invention, realized using a Newton MessagePad 130 equipped with NetHopper http client software and a Motorola RF modem PCMCIA card, for wireless access to the Internet;

FIG. 4A1 is a schematic representation of the relational-type IPI Registrant Database maintained by each IPD Server configured into the system of the illustrative embodiment of the present invention, showing the information fields for storing the information elements representative of the UPN (e.g. UPC data structure, EAN data structure, and/or National Drug Code (NDC) data structure), URLs, trademark(s) ($TM_i$), Company Name (CNi) and company address, Product Description ($PD_i$), E-Mail Address ($EMA_i$) thereof symbolically-linked (i.e. related) for a number of exemplary IPI Registrants listed (i.e. registered) with the IPI Registrant Database maintained by each IPD Server, image files for registered consumer products, and consumer product information request (CPIR) enabling Applets for access by retailers, wholesalers, advertisers, Web publishers, and the like, and inserted within the HTML code of Web documents on various types of Internet information servers hosting WWW sites, as well as EC-enabled WWW-sites, EC-enabled stores and/or on-line e-commerce product catalogues, so that when executed, these CPIR-enabling Applets automatically access a categorized URL menu containing URLs (identified in FIG. 4A2) specifying the location of manufacturer-linked information resources on the Internet, pertaining to a particular UPN-labeled product;

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed hereinafter;

FIG. 4B is a schematic representation of the relational-type Non-IPI Registrant Database maintained by each IPD Server that is configured into the IPI Finding and Serving Subsystem of the illustrative embodiment of the present invention, showing the information fields for storing the information elements representative of the Company Name (CNi) and Company Address, Trademark(s) ($TM_i$) registered by the associated Company, E-Mail Address ($EMA_i$) thereof symbolically-linked for a number of exemplary Non-IPI registrants listed within the Non-IPI Registrant Database maintained by each IPD Server, and CPIR enabling Applets for access by retailers, wholesalers, advertisers, Web publishers, and the like, and inserted within the HTML code of Web documents on various types of Internet information servers hosting WWW sites, as well as EC-enabled WWW sites, EC-enabled stores and/or on-line e-commerce product catalogues, for the purpose described above;

FIG. 4C1 is a schematic representation illustrating the information fields of the table entitled "Manufacturer" used in the RDBMS shown in FIGS. 4A1 and 4A2 hereof;

FIG. 4C2 is a schematic representation illustrating the information fields of the table entitled "Consumer Product" used in the RDBMS shown in FIGS. 4A1 and 4A2 hereof;

FIG. 4C3 is a schematic representation illustrating the information fields of the table entitled "Information Resources on the WWW" used in the RDBMS shown in FIGS. 4A1 and 4A2 hereof;

FIG. 4D is a schematic representation illustrating the information fields of the table entitled "Retailer" used in the RDBMS shown in FIGS. 4A1 and 4A2 hereof;

FIGS. 4E1 and 4E2, taken together, provide a high-level flow chart describing the steps involved in the first illustrative method of creating, loading, distributing, embedding, displaying, and executing "server-side" consumer product information request (CPIR) enabling Applets when using the system architecture and servlet-based search and display mechanism schematically depicted in FIG. 2B1, enabling consumers to automatically search the RDBMS for consumer product information related to a particular UPN-specified product while visiting EC-enabled stores and other WWW sites without disturbing the point of presence of the consumer;

FIG. 4F1 is a schematic representation illustrating the method of FIGS. 4E1 and 4E2 being carried out using certain subcomponents of the system depicted in FIGS. 2-1, 2-2, and 2B1, in particular;

FIG. 4F2 is a schematic representation illustrating in greater detail the Applet-embedding step of the method of FIGS. 4E1 and 4E2, carried out using certain subcomponents of the system depicted in FIGS. 2-1 and 2-2;

BEST MODES FOR CARRYING OUT THE INVENTION

Figure 1:
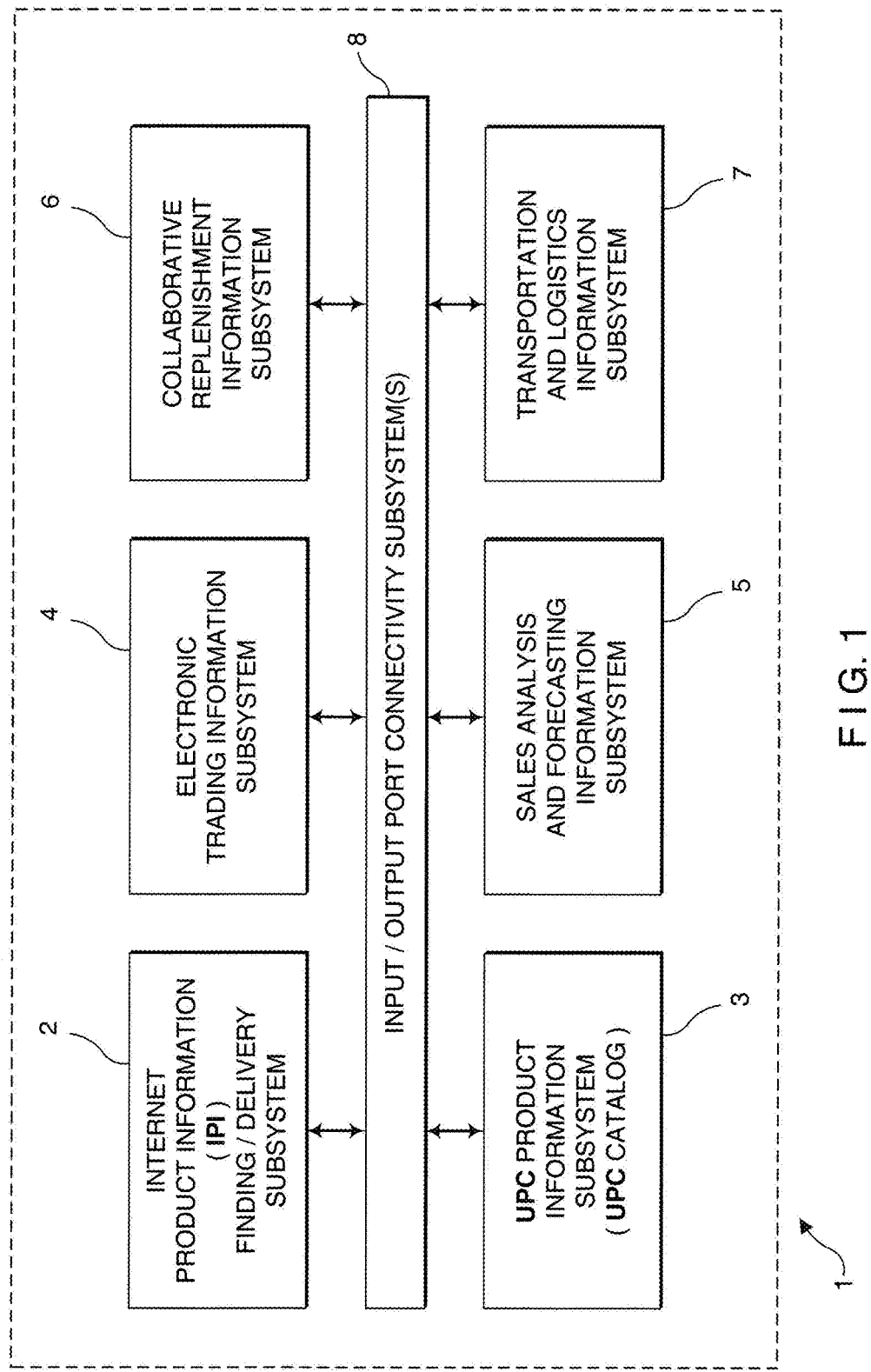
FIG. 1 is a schematic diagram illustrating the various information subsystems provided by the consumer-product information collection, transmission and delivery system of the invention along the consumer-product demand chain, namely an Internet-based Product-Information (IPI) Finding and Serving Subsystem, a UPC-based Product-Information Subsystem ("UPC Catalog"), an Electronic Trading Information Subsystem, a Sales Analysis and Forecasting Information Subsystem, Collaborative Replenishment Information Subsystem, and a Transportation and Logistics Information Subsystem.

Referring to the accompanying Drawings, like structures and elements shown throughout the figures thereof shall be indicated with like reference numerals.

Overview of the System of the Present Invention

As illustrated in FIG. 1, the consumer-product information collection, transmission and delivery system of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers and/or trademarks and tradenames symbolically-linked or related thereto; a UPC Product-Information Subsystem ("UPC Catalog") 3 for providing retailers with accurate up-to-date product information on numerous consumer-products offered for wholesale to retailers by manufacturers registering their products therewith; an Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either Value Added Network (VAN) based EDI transmission or Internet (e.g. HTTP, SMTP, etc.) based electronic document communications; a Sales Analysis and Forecasting Information Subsystem 5 for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer's stores; and Input/Output Port Connecting Subsystems 8 for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems have no way or means of providing such information services to the consumers of UPC-encoded products along the consumer-product supply and demand chain.

Figures 1, 2:
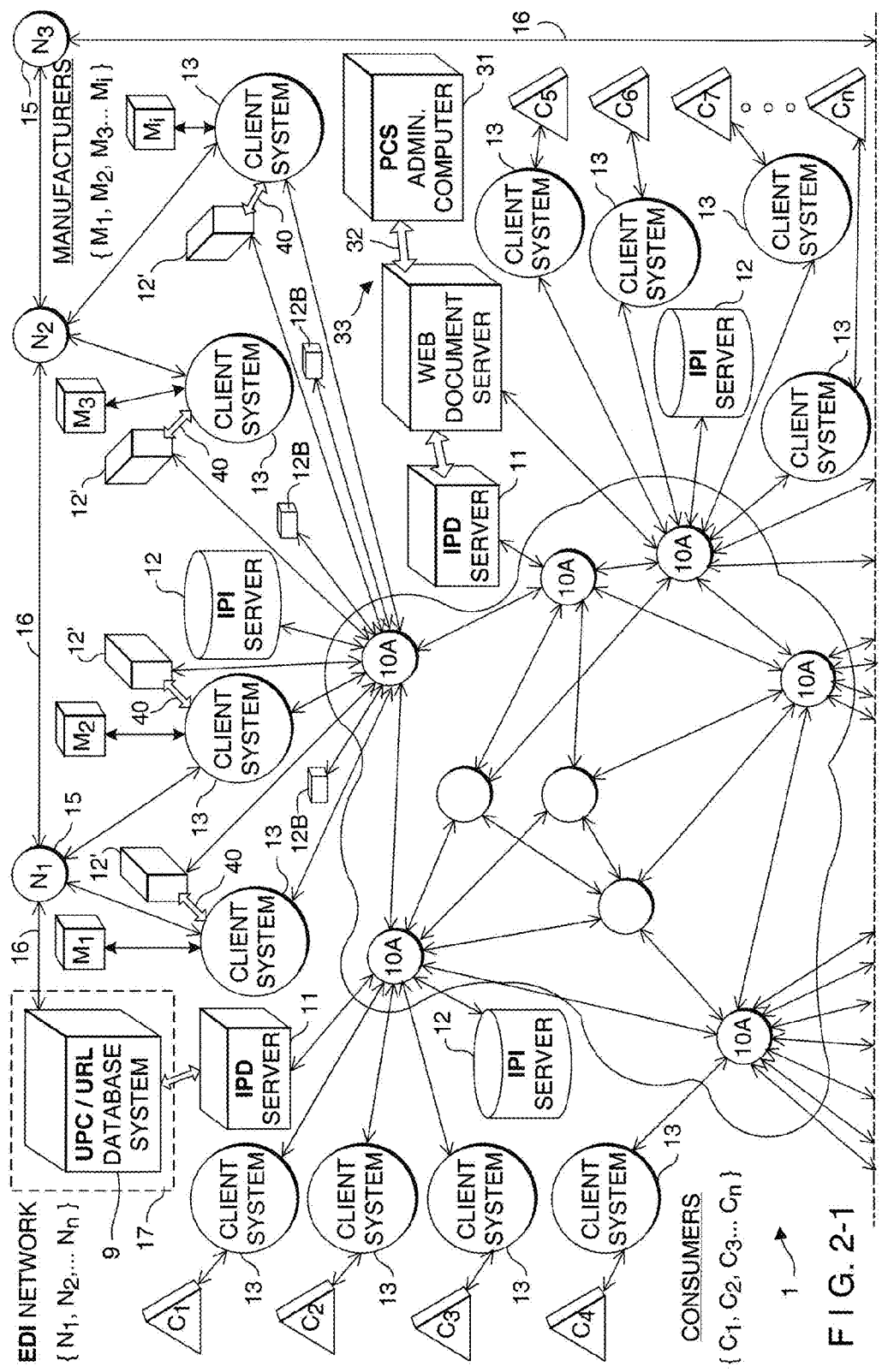
Figure 2:
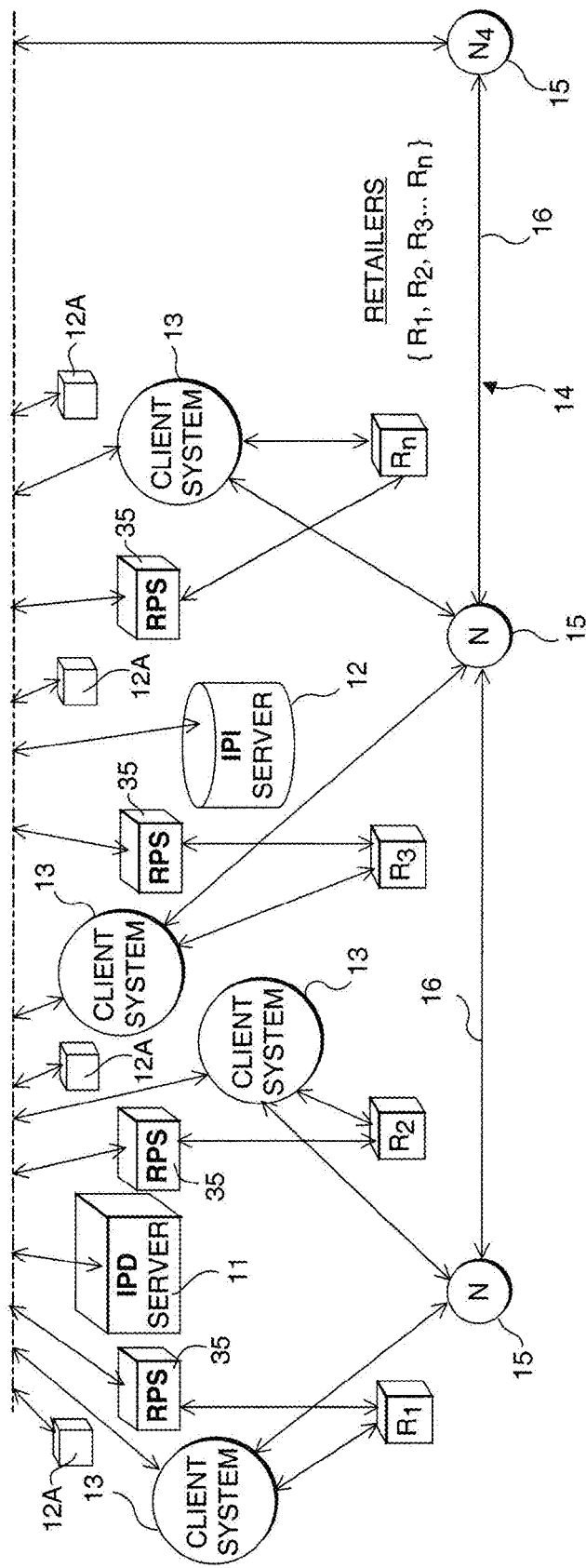
Figure 4C:
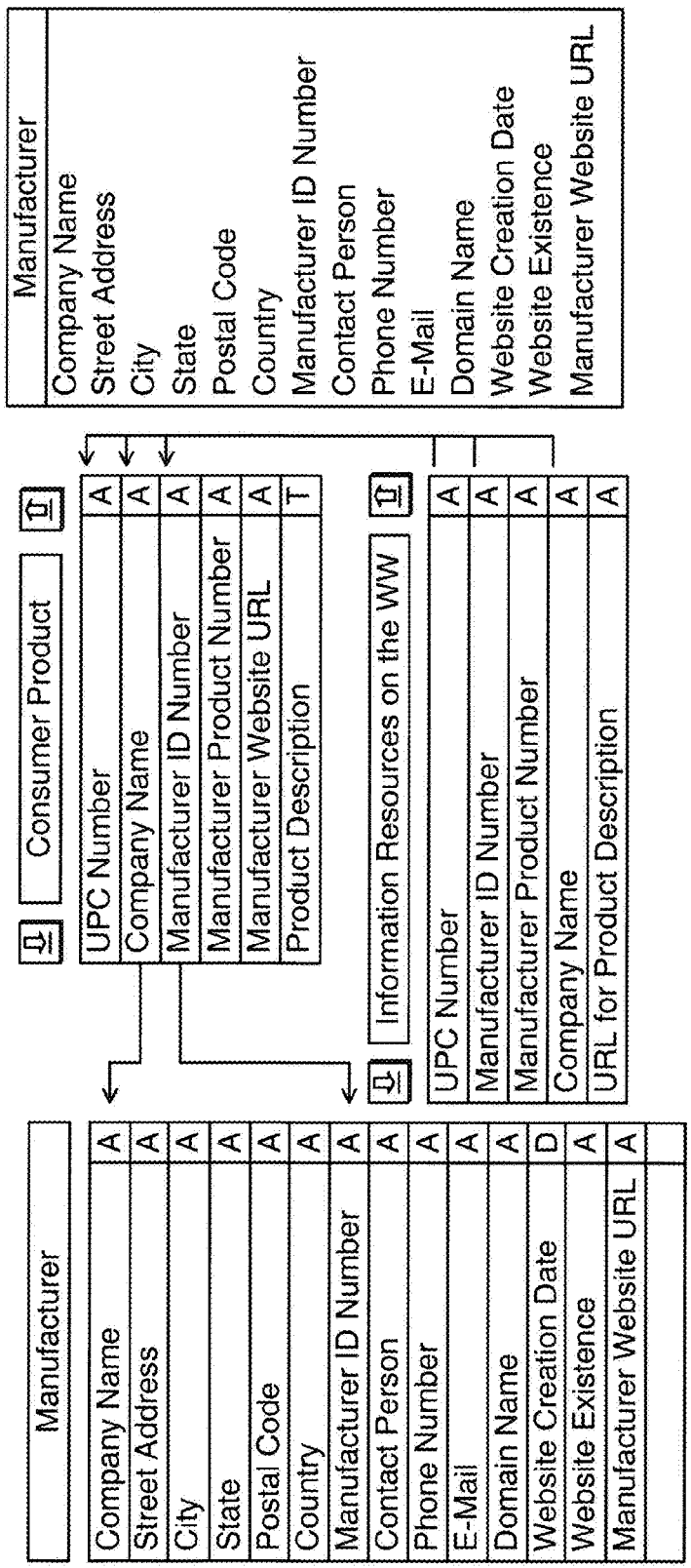
FIG. 4C is a schematic representation of the structure of a relational database management subsystem (RDBMS) used to carry out a best-mode embodiment of the IPI Registrant Database represented in FIGS. 4A1 and 4A2 hereof.

As shown in FIGS. 2-1 and 2-2, the consumer-product information collection, transmission and delivery system of FIG. 1 is realized as an arrangement of system components, namely: a central UPN/URL Database Management Subsystem 9 for storing and serving various types of consumer-product information to retailers, manufacturers and consumers alike (e.g., the name of the product's manufacturer; the Universal Product Code (UPC) or European Article Number (EAN) assigned to the product by the manufacturer; one or more URLs specifying the location of information resources on the Internet at which particular kinds of information relating to the consumer-product can be found; merchandise classification; style number; tradename; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains a mirrored relational-type database structure as represented in FIGS. 4A and 4B; a plurality of Internet Product-Information (IPI) Servers, each indicated by reference numeral 12 and being connected to the Internet via the Internet infrastructure; a plurality of retailer-related electronic-commerce (EC) information servers 12A, each operably connected to the infrastructure of the Internet, and enabling the hosting of one or more EC-enabled stores or EC-enabled on-line catalogues (i.e. EC-enabled WWW sites) owned, operated, managed and/or leased by one or more retailers along the retail supply and demand chain; a plurality of manufacturer-related electronic-commerce (EC) information servers 12B, each operably connected to the infrastructure of the Internet, and enabling the hosting of one or more EC-enabled stores or EC-enabled on-line catalogues (i.e. EC-enabled WWW sites) owned, operated, managed and/or leased by one or more manufacturers along the retail supply and demand chain; a plurality of User (or Client) Computers, each indicated by reference numeral 13, being connected to the Internet via the Internet infrastructure and available to consumers ($C_1$, $C_2$, $C_3$, . . . , $C_i$); one or more data communication (i.e. EDI) networks 14, comprising data collection nodes 15 and communication links 16, operably connected to the centralized UPN/URL Database Management Subsystem 9, each Client Computer 13 available to a Manufacturer (M1, M2, M3, . . . , $M_j$) and Retailer ($R_1$, $R_2$, $R_3$, . . . , $R_k$) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like. As will become apparent hereinafter, Web-based Document Server 30 and Web-based Document Administration Computer 31 provide a subsystem for (i) managing the process of registering qualified manufacturers and their consumer products and related Web pages (e.g. UPC numbers and URLs), and (ii) updating the product-related information with the IPD Servers 11 in an automatic manner to ensure accurate links between UPNs and URLs within the UPN/URL Database Management Subsystem. The subsystem comprising the Web-based Document Server 30 and Web-based Document Administration Computer 31 shall be referred to as the Manufacturer/Product Registration Subsystem of the consumer product information finding and delivery subsystem 2 and indicated by reference numeral 33 throughout the figure drawings hereof.

Preferably, the centralized UPN/URL Database Management Subsystem 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system is scattered across the Planet.

In the illustrative embodiment, the Web-based Document Server 30 is a Windows NT Server running WebDox™ Server software from Premenos Corporation of Concord, Calif. The Windows NT Server can be realized using a suitable computer system having a Pentium® or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox™ Server is provided with a dedicated Internet connection (i.e. ISDN or better) to the Internet infrastructure 10.

The EDI administration computer 31 is either a Windows 95 or Windows NT Computer system running WebDox Admin™ software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDox™ Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having an Intel 486 or higher CPU, 16 MB of RAM or higher, and a VGA monitor or better, and running (i) Microsoft Windows 95 or Windows NT 3.51 or higher Operating System (OS) software, and (ii) Microsoft Internet Explorer 3.0 or higher from Microsoft Corporation. Also, the WebDox Remote™ Server is provided with a dial-up Internet connection (i.e. 14,400 bps or better) to the Internet infrastructure. The function of the Web-based Document Server 30, Web-based Administration System 31 and remote client subsystems 13 running the Premenos® WebDox Remote™ software is to provide a Web-based Document Transport System for automatically transferring information (e.g. UPN/URLs) from manufacturers to the IPD Servers of the system in order to periodically update the same. While the illustrative embodiment of this Web-based Document Transport System has been described in terms of its implementation using the WebDox™ system from Premenos, it is understood that other commercially available electronic document transport systems (e.g. COMMERCE:FORMS™ Electronic Business Forms Package from Sterling Commerce, Inc., http://www.stercomm.com) can be used to carry out this subsystem. The operation of this Web-Based Document Transport System will be described in detail hereinafter with respect to the collection and delivery of consumer product-related information to the IPDs hereof.

The major subsystem components comprising the consumer-product information collection, transmission and delivery system of the present invention will be described in greater detail below.

Figure 2A:
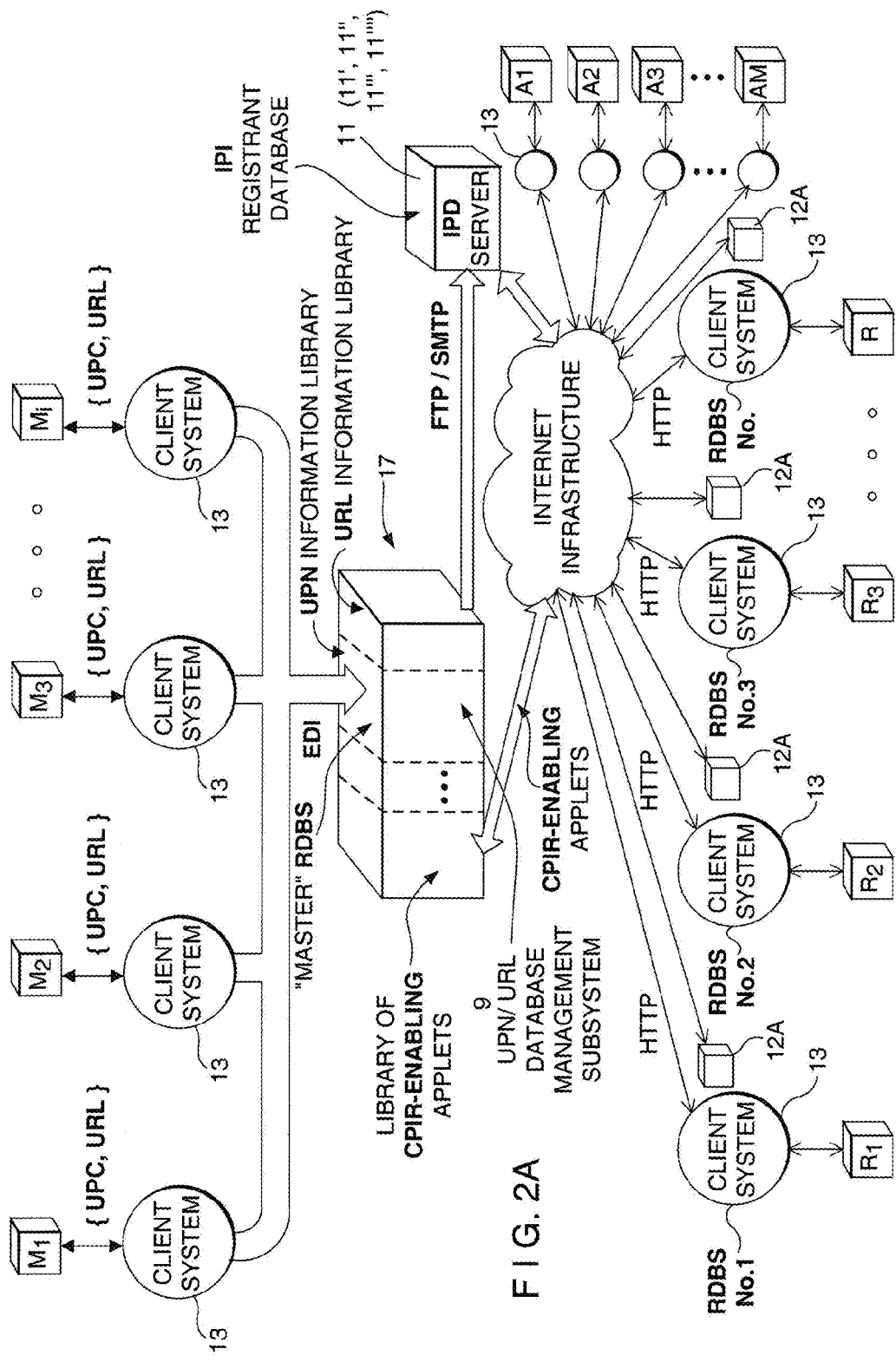
FIG. 2A is a schematic diagram illustrating the flow of information along the consumer-product supply and demand chain, including (i) the communication link extending between the information subsystems of manufacturers of UPC-encoded products and the centralized (or master) UPN/URL Database Management Subsystem 9 of the consumer-product information collection, transmission and delivery system of the present invention, (ii) the communication link extending between the UPN/URL Database Management Subsystem and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/URL Database Management Subsystem and the EC-enabled UPN-based Consumer Product Catalogue Server(s) of the present invention for providing consumer product catalogue services to retailer purchasing agents and others and enabling the on-line purchase of consumer products between trading partners (e.g. manufactures and retailers) using EDI (or XML/EDI) based business-to-business electronic commerce transactions.

In the illustrative embodiment of the present invention, the UPC Product-Information Subsystem 2 is realized using the UPN/URL Database Management Subsystem 9 and data communication networks 14 shown in FIGS. 2-1 and 2-2. Preferably, the product procurement services delivered by the UPN/URL Database Management Subsystem 9 are provided by modifying the prior art QRSolutions UPC Catalog currently implemented by QuickResponse Services, Inc., so that this subsystem includes the database structures (i.e. information fields and data elements) of the IPD Database Server 11 which are neither found in nor suggested by the prior art QRSolutions UPC Catalog. The structure and operation of the UPN/URL Database Management Subsystem and IPD Server of the present invention will be described in greater detail hereinafter. The information services supported by the UPC Product-Information Subsystem 3 include those provided by the prior art QRSolutions UPC Catalog, and also a number of additional information services that can be used to carry out Product Registration within the IPI Finding and Serving Subsystem of the present invention. These additional information services will be described in greater detail hereinafter with reference to FIG. 2A.

The Electronic Trading Information Subsystem 4 is realized using the UPN/URL Database Management Subsystem 9, Client Computer Systems 13 and data communication networks 14 of the technology platform shown in FIGS. 2-1 and 2-2. Preferably, the inventory procurement services delivered by the Electronic Trading Subsystem 4 are provided by the prior art QRSolutions Econnect and Electronic Data Interchange Services currently being implemented by QuickResponse Services, Inc.

Sale Analysis and Forecasting Information Subsystem 5 is realized using information storage/processing center 1, Client Computer Systems 13, and the data communication networks 14 of the enabling technology platform shown in FIGS. 2-1 and 2-2. Preferably, the product inventory management services delivered by the Sale Analysis and Forecasting Information Subsystem 5 are provided by the prior art QRSolutions Sale Analysis and Forecasting Information Services currently being implemented by QuickResponse Services, Inc.

The Collaborative Replenishment Information Subsystem 4 is realized using information storage/processing center 17, Client Computer Systems 13 and the data communication networks 114 of the enabling technology platform shown in FIGS. 2-1 and 2-2. Preferably, the product inventory management services delivered by the Collaborative Replenishment Information Subsystem 6 are provided by the prior art QRSolutions Replenishment Services currently being implemented by QuickResponse Services, Inc.

The Transportation and Logistics Information Subsystem 7 is realized using information storage/processing center 17, Client Computer Systems 13, and the data communication networks 14 of the enabling technology platform shown in FIGS. 2-1 and 2-2. Preferably, the product distribution management services delivered by the Transportation and Logistics Information Subsystem 7 are provided by the prior art QRSolutions EDI and Logistics Management Services currently being implemented by QuickResponse Services, Inc.

One of the primary functions of the client subsystems 13 hereof is to provide UPN-driven consumer product information (CPI) GUIs within both physical "brick and mortar" retail stores and E-commerce enabled retail stores and product catalogues. Hereinafter, UPN-driven CPI GUIs provided within physical retail shopping environments will be referred to as "physical" or "physically-based" UPN-driven CPI kiosks, whereas UPN-driven CPI GUIs provided within "E-commerce" enabled retail shopping environments will be referred to as "cyber" UPN-driven CPI kiosks, despite the fact that these devices may provide substantially the same type of consumer product information services to consumers, retailers and manufacturers along the retail supply and demand chain.

Physically-based UPN-driven CPI consumer product information kiosks will have great utility in physical retail shopping environments. However, such subsystems will be of little value to consumers browsing the Internet and shopping at EC-enabled WWW sites, unless the consumers are located in "brick and mortar" type retail stores wherein consumers are provided with the option of shopping and conducting e-commerce transactions therein for all or selected items of merchandise offered for sale by the retailer. Moreover, when shopping in any particular retailer's EC-oriented store, however realized, it is also understood that great efforts must be undertaken to ensure that the shopper does not leave the EC-oriented store prior to making a purchase at the checkout page of the EC-oriented WWW site. Requiring, prompting or otherwise encouraging a shopper to link over to the IPD WWW site hereof (e.g. hosted on the IPD information server) for desired consumer product related information oftentimes presents a great risk that the shopper will not return to the EC-oriented store, at which he or she was once visiting, but rather will visit another EC-oriented store to make the product purchase.

The above limitations of physically-based consumer product information kiosks and the risks associated with consumer behavior while shopping on the Internet are overcome by the UPN-based cyber kiosks of the present invention. The primary function of UPN-based cyber CPI kiosks is to provide consumers with a simple and effective way of, and means for, producing UPN-driven CPI graphical user interfaces (GUIs) at the consumer's point of presence (POP) which may exist, for example, when: (i) shopping at EC-enabled stores, product catalogs and other types of EC-oriented WWW sites; (ii) reviewing and responding to Internet-based product advertisements (including Web-based discount coupons and the like) published at selected sections of Web-documents served from diverse types of WWW sites hosted on the millions of Internet information servers connected to the infrastructure of the Internet; and/or (iii) encountering a Web-document addressing a particular consumer product under review, analysis or other form of observation where accurate consumer product related information is desired or required by the consumer, whomever they might be. The details of producing UPN-enabled CPI GUIs in both physical and cyber retail environments will be described hereinafter.

As shown in FIG. 1, each synchronized IPD Server 11 is interfaced with an ISP 10A in a conventional manner. The actual number of IPD Servers 11 used in any particular application will depend on various factors including, for example, user demand, Internet traffic conditions, network router capacity and performance, etc. Each such IPD Server 11 is assigned a static IP address and a common domain name on the Internet according to the Domain Name System (DNS) well known in the art. Data synchronization among such databases can be achieved using conventional data synchronization techniques well known in the art. In addition, a backup and mirroring program can be used to maintain data security. Preferably, the synchronized IPD Servers are maintained by a team of network managers under the supervision of one or more webmasters.

Using presently known technology available for use on the WWW, there are different ways of configuring IPD Server 11 and back-end UPN/URL Database Management Subsystem 9 of the illustrative embodiment. A preferred subsystem architecture is schematically depicted in FIG. 2B1.

While client-side Applets ("Applets") have their <APPLET> HMTL tags embedded within HTML documents (e.g. using the HTML 3.2 Specification), and are executed with Java-enabled browsers on the client-side of the information network, the server-side Applets ("Servlets") employed in the system architecture set forth in FIG. 2B1 have their <SERVLET> HMTL tags embedded within HTML documents (e.g. the HTML 3.2 Specification), and are executed within Java-enabled Web servers on the server-side of the information network. Collectively, client-side Applets and server-side Applets shall be referred to as "Applets", wherein the major distinction between these two types is based on where the Applet is executed on the network (i.e. client-side or server side).

The IPD Server 11 performs a number of basic functions, for example: (1) serving HTML-encoded documents associated with IPD Web-sites to client subsystems 13 on the Internet so as to enable the six primary modes of operation of the consumer product information finding and delivery subsystem hereof including, but not limited to, access to consumer product related information stored within the IPI and Non-IPI Registrant Databases on the UPN/URL Database Management Subsystem 9; as well as (2) serving Libraries of executable files containing "UPN-enabled Java Applet tags" for client-side Applets as well as server-side Applets a/k/a "Servlets", so as to enable retailers, manufacturers, advertisers, et al to download the executable "Applet tag containing" file to client subsystems.

According the system architecture shown in FIG. 2B1, the UPN/URL Database management Subsystem 9 is realized by a SQL-based RDBMS server 9, whereas the IPD server 11 is realized by a Java Web Server 11', provided with Java servlet support, and operably connected to the RDBMS server 9 by way of a high-speed digital transmission link known in the art. During system operation, the Java Web Server 11' serves to a Java-enabled client subsystem 13, an HTML-encoded document containing a servlet HMTL tag <SERVLET> which, upon selection by a single mouse-clicking operation by the consumer, sends an http request to the Java Web Server 11', invoking a prespecified UPN-encoded servlet stored therewithin, causing the CPIR-enabling servlet to execute on the server-side of the network. This causes the servlet to call and run certain predefined Java methods which carry out a UPN-specified CPI search on the RDBMS server 9 and return the search results to the client subsystem 13 for display within a predetermined GUI generated therewithin. Using this system architecture, each UPN-encoded servlet executed within the Java Web Server 11' will contain information relating to (1) the UPN-specified consumer product on which product information is to be searched for within the RDBMS server 9, (2) licensing information relating to whom the CPIR-enabling servlet has been licensed (although this architecture does not enable easy enforcement of the granted license as the servlet is executed on the server side of the network).

In the illustrative embodiment shown in FIG. 2B1, the Java (enabled) Web Server 11' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; and (2) a servlet-enabled Web (http) server software program such as the Java Web Server (JWS) 1.0 or later from JavaSoft, division of Sun Microsystems, Inc., or the JigSaw Web Server from the World Wide Web Consortium, each proving native Java support, or alternatively, the Fastrak™ Web (http) server from Netscape Communications, Inc., the Internet Information Server (IIS) from the MicroSoft Corporation, the Apache HTTP Server from The Apache Software Foundation Web-site, or any other http server capable of transporting HTML-encoded documents, in conjunction with the Java Servlet Developer's Kit from JavaSoft, or the Servlet Express Tool from IBM Research Labs in Haifa, Israel, for managing servlets on Web servers lacking native Java support. In order to develop servlets, the Java Web Server 11' should also be equipped with the following software tools: the Sun Java Developers Kit 1.1.x from Sun Microsystems, Inc.; and the Java Servlets Development Kit (JDSK) from Sun Microsystems, Inc., or a Java Development Environment that supports JDK 1.1.x, such as VisualAge for Java by IBM, MicroSoft's Visual J++, or the like. Optionally, the Java Web Server 11' may also include Web-site development software (e.g. based on the HTML 3.2 or 4.0 Specification) for creating and maintaining the IPI Web-sites of the present invention, although such tools will be typically run on client subsystem 13 for practical reasons.

In the illustrative embodiment shown in FIG. 2B1, each SQL-based RDBMS Server 9 can be realized by, for example, the Origin 200 Server from Silicon Graphics, Inc., the $O_2$ Desktop Workstation from Silicon Graphics, Inc., a ULTRA™ information server from Sun Microsystems, Inc., or any other suitable computing machine, running a RDBMS software program such as ORACLE 8.0 from Oracle Corporation, Sybase SQL from Sybase, Inc., Access 98 from Microsoft, or other database development programs based on a database programming language such as the SQL Language, the Sybase language, or any other suitable database language enabling database programming and connectivity over the Internet.

In principle, there can be millions of IPI Servers 12 within the system hereof, each enabled to serve Web-based documents containing consumer product related information. Notably, each such IPI Server 12 can be realized by, for example, the Origin 200 Server from Silicon Graphics, Inc, the O2 Desktop Workstation from Silicon Graphics, Inc., the ULTRA™ information server from Sun Microsystems, Inc., or any other computing machine (e.g. desktop, palmtop, laptop, etc.) running an operating system (e.g. UNIX, LINUX, Macintosh, MS Windows, etc.) capable of performing the functions of an Internet (http) information server in a client-server distributed object computing environment. As shown in FIGS. 2-1 and 2-2, each IPI Server 12 is interfaced with an ISP 10A in a conventional manner. Each such IPI Server 12 is assigned a static IP address and a unique domain name on the Internet. Each IPI Server 12 is also provided with (i) Web-site development software for creating HTML-encoded multimedia pages for Web-site development, and (ii) Web-site server software for supporting HTTP and serving HTML, XML and other document formats used to construct hypermedia-type Web-sites containing product related information of a multi-media nature. Such Web-sites can be expressed in HTML, XML, SGML and/or VRML or any other suitable language which allows for Web-site construction and Web-site connectivity. Web-site management software can be used to maintain correct hyper-links for any particular Web-site. Preferably, the IPI Servers 12 are maintained by a team of network managers under the supervision of one or more webmasters.

Each retailer-related electronic-commerce (EC) information server 12A indicated in FIGS. 2-1 and 2-2 is operably connected to the infrastructure of the Internet. In general, each retailer-related information server 12A can be realized by, for example, the Origin 200 Server or O2 Desktop Workstation from Silicon Graphics, Inc., a high-end information server from Sun Microsystems, Inc., or any other computing machine that can perform the function of a Server in a web-based, client-server type computer system architecture of the illustrative embodiment. As shown in FIGS. 2-1 and 2-2, each retailer-related EC-enabled information server 12A is interfaced with an ISP 10A in a conventional manner, and is assigned a static IP address and a unique domain name on the Internet. Each retailer-related EC-enabled information server 12A is also provided with: (i) Java-enabled WWW (http) server software, such as Netscape Communications FastTrak Information Server software, for supporting http, ftp, XML/ICE and other Internet protocols, and serving HTML and XML formatted documents (i.e. pages) associated with Web-sites containing product related information of a multi-media nature; (ii) an advanced EC-enabled product merchandising software solution, such as the Host and Merchant (or Enfinity) Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, creating business-to-business and business-to-consumer product catalogs; (iii) an Internet Advertisement Management Software Solution, such as OPEN ADSTREAM™ Internet ad management software solution by REAL-MEDIA, Inc. of New York, N.Y.), for managing all aspects of Internet advertising on Internet information servers; and optionally (iv) Web-site development software for enabling the creation of HTML-encoded multi-media pages and the like for the EC-enabled Web-site development. Such EC-enabled Web-sites can be expressed in HTML, XML and/or VRML or any other suitable language which allows for Web-site construction and Web-site connectivity. Web-site management software can be used to maintain correct hyper-links for any particular Web-site. Preferably, each EC-enabled retailer-related server 12A is maintained by a team of network managers under the supervision of one or more webmasters. The primary function of each retailer-related EC information server 12A is to enable the hosting of one or more EC-enabled stores or EC-enabled on-line catalogues (i.e. WWW sites) owned, operated, managed and/or leased by one or more retailers, (and, optionally, wholesalers and manufacturers as well) along the retail supply and demand chain. The use of the Intershop 4 Hosting and Merchant E-commerce software solution enables sellers to design and build dynamic environments for buyers and sellers by enabling sellers (i.e. vendors) to: (1) create a unique look and feel for their e-commerce sites using a Web browser; (2) fully customize their e-commerce sites to maximize the buyers experience, using an import/export function for easily importing existing product databases and site design directly into the Intershop; (3) build detailed profiles of buyers and present them with products that match these profiles, creating a personalized shopping experience; and (4) offer complementary products for sale based on current selections, thereby raising the overall value of each e-commerce transaction carried out. Also, the back-office portion of the Intershop 4 E-commerce Solution is intuitively organized to make it easy for sellers to manage their on-line business through a Web browser.

Each manufacturer-related electronic-commerce (EC) information server 12B indicated in FIGS. 2-1 and 2-2 is operably connected to the infrastructure of the Internet. In general, each manufacturer-related EC information server 12B can be realized by, for example, the Origin 200 Server from Silicon Graphics, Inc., the O2 Desktop Workstation from Silicon Graphics, Inc., the ULTRA™ information server from Sun Microsystems, Inc., or any other computing machine that can perform the function of a http server in a client-server distributed object computing environment. As shown in FIGS. 2-1 and 2-2, each manufacturer-related EC-enabled information server 12B is interfaced with an ISP 10A in a conventional manner, and is assigned a static IP address and a unique domain name on the Internet. Each manufacturer-related EC-enabled information server 12B is also provided with: (i) Java-enabled WWW (http) server software, such as Netscape Communications FastTrak Information Server software, for supporting http, ftp, and other Internet protocols, and serving HTML and XML formatted documents (i.e. pages) associated with Web-sites containing product related information of a multi-media nature; (ii) an advanced EC-enabled product merchandising software solution, such as the Host and Merchant Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, or creating business-to-business and business-to-consumer product catalogs; (iii) an Internet Advertisement Management Software Solution, such as OPEN ADSTREAM™ Internet AD management software solution by REAL-MEDIA, Inc. of New York, N.Y., for managing all aspects of Internet advertising on Internet information servers; and optionally (iv) Web-site development software for enabling the creation of HTML-encoded multi-media pages and the like for the EC-enabled Web-site development. Such EC-enabled Web-sites can be expressed in HTML, XML, SGML and/or VRML or any other suitable language which allows for Web-site construction and Web-site connectivity. Web-site management software can be used to maintain correct hyper-links for any particular Web-site. Preferably, each EC-enabled manufacturer-related server 12B is maintained by a team of network managers under the supervision of one or more webmasters. The primary function of each manufacturer-related EC information server 12B is to enable the hosting of one or more EC-enabled stores or EC-enabled on-line catalogues (i.e. WWW sites) owned, operated, managed and/or leased by one or more manufacturers, (and, optionally, wholesalers and retailers as well) along the retail supply and demand chain.

Each Client Computer Subsystem (hereinafter "client subsystem") 13 can be realized by any computing system employing operating system (OS) software (e.g. Macintosh, Windows 95, Windows NT, Unix, etc.) which supports a Java-enabled Internet browser program (e.g. Netscape's Navigator, MicroSoft's Explorer, NCSC's Mosaic, etc.). The operating system should also include: (1) Internet networking software that supports the TCP/IP networking protocol (required by HTTP, FTP and the like) and provides a JAVA GUI-based Web browser interface; and, in the case of client computer machines 13 that are used by manufacturers and retailers in their "back office" operations, (2) Electronic Data Interchange (EDI) networking software that supports all versions of EDI between two or more client subsystems over the VAN-based or Web-based EDI networks illustrated in FIGS. 2-1 and 2-2. Alternatively, client subsystems may also be realized by any of the following systems: (i) a Newton MessagePad 130 (running the Newton 2.0 Operating System and NetHopper™ Internet Software and equipped with a Motorola RF PCMCIA modem card); (ii) a Pippin™ computer system from Apple Computer, Inc.; (iii) a PalmPilot VII wireless Internet-enabled palmtop computing device by 3COM, Inc.; (iv) a network computer (NC) that supports the Java™ programming language and Java applets expressed therewith; (v) a Sony® WebTV Internet Terminal (supported by the WebTV Service provided by WebTV Network, Inc.); or the like. As shown in FIG. 1, each Client Computer is interfaced with an ISP 10A in a conventional manner Each such client subsystem may be assigned a static IP address and a unique domain name on the Internet, or one may be dynamically assigned thereto by way of its ISP depending on its connectivity, and set of assigned functions within the consumer product information network of the present invention. Optionally, any client subsystem may include Web-site (http) server software serving Web documents of various formats (HTML, XML, SGML or the like) from one or more hypermedia-type Web-sites in a manner well known in the art.

Typically, each client subsystem 13 will be maintained by either present or future manufacturers, retailers and/or consumers of products, about which information can be found on the Internet. As shown in FIG. 3A1, any client subsystem of the present invention may be realized as a desktop computer workstation comprising: a processor and memory 19; a visual display monitor 20; a keyboard 21; a JAVA GUI mouse 22; and a bar code symbol reader 23 for reading UPC, UPC/EAN and other types of bar code symbols printed on consumer products, brochures, documents, and the like.

As shown in FIG. 3A2, any Client Computer 13 may also be realized in the form of a Web-based (wired or wireless) multi-media kiosk, designed for use as a "Cyber sales agent" within retail shopping environments. As shown in FIG. 3A2, the Web-based kiosk of the present invention may comprise: a floor, wall or ceiling supported housing 25; an omnidirectional laser bar code symbol reader (e.g. Metrologic MS 6720 Laser Scanner) 26 for reading UPC (and other types of) symbols printed on products, brochures, documents and the like; an active-matrix LCD-type visual display screen 27 for viewing product related information; a touch-screen type keyboard and pointing device 28 for clicking on anchored links on Web pages, entering information into client subsystem during its use; audio-speakers 29A for supporting multimedia Web-sites that may be visited when using the client subsystem; a color or black/white printer for printer 29B for printing out Web pages under consumer command during an information finding session using the system; and also, one or more floppy-disc (or otherwise removable) drive units 29C, accessible to the consumer for recording promotional and trial versions of information-based consumer products (e.g. video and audio recordings, computer software products, and the like) on removable information storage media (e.g. 1.44 MB floppy discs, 100 MB Zip® floppy discs, 1 GB Jazz® floppy discs, etc.) supplied by either the retailer or the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

The client computer system of the present invention 13 may also be realized in the form of a bar code driven multimedia kiosk mounted upon a conventional shopping cart, or other transportation vehicle, so as to be completely transportable within retail shopping environments for the convenience of consumers, as shown in FIG. 3A3.

In alternative embodiments, any Client Computer 13 can be realized as a network computer (NC), a Web-TV™ type Internet Terminal, a Newton MessagePad® PDA, or any other device providing Internet access to the IPI Web-site (i.e. mirrored IPD Servers) of the present invention. Notably, the same functionalities provided within the Web-based kiosk described above can be embodied with such alternative embodiments of the client computer system. For example, as shown in FIG. 3A4, the client computer subsystem 13 can be realized as a transportable hand-held computer, such as the Newton® Model 130 Messagepad 70 from Apple Computer, Inc. of Cupertino, Calif., provided with NetHopper™ brand Internet Access (http-client) Software which supports the TCP/IP networking protocol within the Newton MessagePad operating system, as well as the client-side of http, as taught in U.S. Pat. No. 5,905,251 incorporated herein by reference. Notably, the NetHopper™ brand Internet Access (http-client) Software 71 provides the Newton Model 130 Messagepad with an integrated JAVA GUI-based web browser program for WWW access in a manner known in the Internet access art. As shown in FIG. 3A4, the Newton Messagepad has a display panel 72, touch-screen type keypad 73, and programmed laser scanning bar code symbol reader 74 (e.g., Metrologic ScanQuest® Laser Scanning Module Model No. IS4120), integrated within the hand-held device, as described in U.S. Pat. No. 5,905,251. The function of bar code symbol scanner 74 is to read UPC or UPC/EAN symbols on consumer products and to produce symbol character data representative of the numbers encoded within such standardized bar code structures. The Newton Messagepad Model 130, denoted by reference numeral 70, is also equipped with a Motorola PCMCIA-based modem card 75 having a RF transceiver for establishing a wireless digital communication link with either a cellular base station or one or more satellite-base stations 76 connected to the Internet by way of an ISP or NSP 10A in a manner well known in the global information networking art. As such, a first wireless digital communication link 77 is established between the Newton Messagepad 130 and cellular (or satellite) base stations 76, and a second digital communications link 78 is established between the base station 76 and the ISP or NSP associated with the infrastructure of the Internet. Accordingly, this embodiment of the client computer subsystem of the present invention is completely mobile (i.e. transportable) and provides the consumer access to the Internet and all of its information resources on the WWW and elsewhere, provided that the device maintains its wireless digital communication link with base station 76, distributed throughout the globe, making access to the IPD servers hereof possible at home, in the office, within retail stores, as well as on the road wherever that may be.

Notably, it is understood that there will be many different types of wireless mobile Internet-enabled access terminals that may be used to realize the client computer subsystems of the present invention. For example, recently 3COM, Inc.

introduced into its commercial product line the PalmPilot VII Wireless Hand-Held Internet Access Terminal, which is similar in many respects to the Newton Messagepad Model 130 equipped with the Motorola PCMCIA-based modem card 75, and NetHopper™ Software, described above. Also, Symbol Technologies, Inc. of Holtsville, N.Y. has introduced the Symbol SPT 1500, SPT 1700, SPT 1740 and PPT 2700 handheld wireless bar code scanning Internet access terminals which have virtually the same functionalities embodied within the wireless hand-held Internet access terminal shown in FIG. 3A4, and originally disclosed in U.S. Pat. No. 5,905,251, supra.

The Web-enabled client subsystems 13 of the present invention described hereinabove may be used to access consumer product-related information, as well as to carry out electronic-commerce related transactions, at home, at work, in the office, on the road, as well as in physical retail shopping environments.

For example, when visiting particular EC-oriented (i.e. electronic-commerce enabled) Web-sites, a consumer may scan UPC (and/or UPC/EAN) numbers on products within his or her home (e.g. in the pantry) using any one of the client computer subsystems hereof, equipped with a bar code symbol reader in order to remotely purchase such consumer products using credit or debit type financing, and direct shipment of purchased products to the consumer's home or elsewhere by a particular delivery service. Such EC-enabled WWW sites, commonly referred to as electronic-commerce (EC) stores or storefronts, as well as on-line electronic commerce catalogues, can be operated by manufacturers, wholesalers and/or retailers of consumer products, as indicated in FIGS. 2-1 and 2-2. As shown therein, retailer operated, managed and/or owned EC stores (i.e. EC-enabled WWW sites) are hosted on retailer operated/owned EC information servers (MECIS) 12B, whereas manufacturer operated, managed and/or owned EC stores (i.e. EC-enabled WWW sites) are hosted on manufacturer operated/owned EC information servers (MECIS) 12B operably connected to the infrastructure of the Internet.

The consumer product information delivery system of the present invention shall enable an infinite array of applications with regard to electronic commerce and home shopping, now made possible by the present invention.

The Database Structure of the IPD Server

In the illustrative embodiment of the present invention, each data-synchronized IPD Server 11 of the preferred embodiment maintains at least two different relational-type databases, namely: an IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labeled information fields for each product "registered" therewith, namely: an IPN Information Field for storing information (e.g. numeric or alphanumeric string) representative of the Universal Product Number (e.g. twelve-digit UPC Version A number, eight-digit UPC Version E number, thirteen-digit UPC/EAN number, or twelve-digit UPC Version A number plus five-digit Add-On Code Segment number frequently used in the publishing industry) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of the multimedia type can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; a CPIR-Enabling Applet Information Field for storing information representative of consumer product information request (CPIR) enabling Applets accessible by retailers, wholesalers, advertisers, Web publishers and the like by downloading operations to be described in detail hereinafter, and eventually inserted within the HTML code of Web documents on various types of Internet information servers used to host WWW sites of all sorts, so that, when executed, these CPIR-enabling Applets automatically access from the master UPN/URL Database Management Subsystem 9 hereof, a categorized menu of URLs specifying the location of information resources on the Internet pertaining to a particular UPN-labeled product and symbolically linked thereto by its manufacturer or authorized agent; image file storage field for storing color images of consumer products registered with the system; and a Status Information Field for storing information (e.g. numeric or alphanumeric string) representative of whether the company (e.g. manufacturer) associated with the registered product has paid their monthly, quarterly or annual registration fees associated with registration within the IPD Servers of the information finding and serving subsystem hereof. Notably, each information item contained within the information field shown along the same horizontal line of FIG. 4A1 is related or linked.

In general, the URL stored in the URL Information Field specifies the address of an information resource on the Internet (e.g. Web), and thus may point to any one of the following types of information resources: an HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mail to", and specifies the type of resource that the URL is pointing (i.e. connecting) to; a Host Indicator, represented by double slashes "//" if the URL is requesting information from a Web Server; Server Name comprising an Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.html", identifying the actual named information file that contains actual information resource specified by the URL.

As used herein as well as in the Claims to Invention, the term "registered" and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained within the information field shown along the same horizontal line of FIG. 4A1 is symbolically related or linked. Different products of the same registrant or related registrant may also be linked together so that a user looking for information about a particular product is automatically provided with URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere in the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit "product" number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its client subsystem, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet, relating to specifications on the product; a Product Update Information Field for storing information representative of URLs pointing to information on the Internet relating to product updates, recalls, notices, etc; a Product Distributor (e.g. Wholesaler and/or Resaler) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10Ks, annual reports, etc.), and the like. Each URL symbolically linked to a UPC-labeled product registered in the Registered IPI Database is categorized within one or more of these URL categories.

The list of URLs recordable in the IPI Registrant Database for each registered UPC-labeled product is virtually unlimited. Below are just a few examples of how the IPI Finding and Serving Subsystem hereof can be used as a virtual sales agent that provides value-added services to consumers, retailers and the like.

For each CD sound recording, the URL list may contain a URL that points to a promotional QuickTime® video recording or MP3-formatted sound recording published on the WWW for review and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL can contain a URL that points to a Web-based Specification Sheet that can be printed out in a retail environment, at home, at work or on the road.

For groceries and like articles, the URL list may contain a URL that points to a multi-media clip on the WWW that provides a QuickTime® video recording, or the like, of the product, illustrating various cooking recipes and uses for the product. Also, the URL list can contain a URL that points to a Web-based Discount Coupon that can be printed out in the store, at home or at work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides a QuickTime® video recording, or the like, of the clothing, garments, and/or accessories being modeled by stunning fashion models. Ideally, such video recordings, linked to particular articles of wearing apparel by their UPC number, can be used to extend and augment the advertising campaign being carried out in other forms of media (e.g. television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI Finding and Serving Subsystem hereof. Also, using the Manufacturer/Product Registration Subsystem hereof, manufacturers and/or their agents can easily link their UPNs (e.g. UPC and/or EANs) with such URLs and manage the same in a dynamic manner to ensure that product related information on the Internet is accurately linked to the UPNs of the manufacturer's products. Through such active participation, the business objectives of any particular manufacturer or retailer can be promoted by way of the IPI Finding and Serving Subsystem of the present invention. In this way, the information requesting consumer is provided with only the kinds of product-related information which he or she seeks.

As shown in FIG. 4B, the Non-IPI Registrant Database maintained by each IPD Server comprises a plurality of labeled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string) representative of the name of the company making, selling or distributing the corresponding non-registered product; a Trademark Information Field for storing information (e.g. text and/or alphanumeric strings) representative of each trademark used in connection with the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product has been solicited by the IPD Server, and on what dates registration solicitation has occurred. Notably, each information item contained with the information field shown along the same horizontal line of FIG. 4A1 is related or linked. The information required to construct the Non-IPI Registrant Database shown in FIG. 4B can be readily obtained from a number of commercially or publicly available information sources (e.g., the Universal Code Council, Inc., Dayton, Ohio; QRS, Inc. of Richmond. Calif.; General Electric Information Services (GEIS) of Delaware, Md.; etc.).

Constructing the IPI Registrant Database within the IPI Finding and Serving Subsystem Hereof The utility of the product finding functionalities of the IPI Finding and Serving Subsystem hereof depends in large part on the number of consumer-products registered with the IPI and Non-IPI Registrant Databases supported within the UPN/URL Database Management Subsystem 9 hereof, as illustrated in FIG. 2B1. In principle, numerous techniques may be employed separately or in combination with each other in order to construct the IPI and Non-IPI Registrant Databases of the present invention. A number of techniques will be detailed below.

According to a first database construction technique, the administrator of the IPI Registrant Database would transmit Product Registration Requests (PRRs) in the form of electronic documents to each and every manufacturer having been issued, for example, a six digit UPC Manufacturer Identification Number (MIN) by the UCC, Inc. Such electronic documents can be transmitted using conventional MIME protocols such as, for example, STMP. The Product Registration Request document would seek to ascertain from the manufacturers the various information items (including the menu of URLs) identified in the IPI Registrant Database of FIG. 4A1. In response to the Product Registration Request, each solicited manufacturer would send back to the administrator of the IPI Registrant Database (for each of its consumer products) its UPC number and a menu of categorized URLs indicating the location of the information resources identified in the Product Registration Request document. This information can then be used to readily construct the IPI Registrant Database of the illustrative embodiment.

According to a second database construction technique, a global advertising campaign would be launched (over various media) in order to solicit the various information elements identified in the IPI Registrant Database of FIG. 4A1 and thus register the products of the manufacturers selling UPC-labeled products. Preferably, such information would be collected by way of an electronic data transfer subsystem(s) set-up to cooperate with the system of the present invention in order to facilitate database construction operations.

According to a third database construction technique, the IPI system itself would continuously solicit consumer product registrations over time in order to collect information from companies responding favorably to the solicitations. While such solicitation efforts can involve the issuance of product registration requests using various types of media, it is preferred that the information collection operations are carried out using electronic data transfer techniques (e.g. ftp, EDI or XML/ICE) described hereinabove.

Method of Constructing UPN-Encoded Server-Side Applets and Distributing the HMTL Tags Associated therewith to Remote Client Subsystems for Embedding within HTML-Encoded Documents to be Published Over the Internet in Connection with UPN-Labeled Consumer Products In general, for the system architecture shown in FIG. 2B1, a server-side driven method is used to access consumer product related information (e.g. UPN/URL links) from the RDBMS server 9 and display the search results within a Java-based GUI at the point of presence of the consumer using a Java-enabled client machine 13. In order to practice this method, it will be necessary to construct server-side UPN-encoded CPIR-enabling Applets for registered consumer products, distribute the HTML tags associated therewith to remote client subsystems, and thereafter embed these CPIR-enabling Applet tags within HTML-encoded documents for publishing over the Internet. This CPIR-enabling Applet (i.e. Servlet) construction, distribution and embedding method will now be described in detail hereinbelow.

The Servlet-Driven Method of Accessing and Displaying Categorized UPN/URL Link Menus from the UPN/URL Database Management Subsystem of the Present Invention After providing a brief overview on the system architecture of FIG. 2B1 and the nature of the server-side CPIR-enabling Applets (i.e. Servlets) deployed therewithin. The steps associated with the Applet-driven CPI-acquisition method of the first illustrative embodiment will be described in detail with reference to FIGS. 4E1, 4E2, 4F1 and 4F2.

In general, the method of FIGS. 4E1 and 4E2 involves using a server-side CPIR-enabling Applet (i.e. Servlet) to automatically conduct a UPN-directed search on the UPN/URL Database Management Subsystem 9 hereof (i.e.

RDBMS server 9) in response to a single mouse-clicking operation by the consumer on the HTML tag associated with the server-side Applet. In the illustrative embodiment, the CPIR-enabling servlet of the present invention is a program written in the Java™ programming language and has an HTML tag (indicated by <SERVLET>) which is designed to be included in an HTML page, much in the same way an image can be included therewithin (according to the HTML 3.2 Specification).

CPIR-enabling servlets of the present invention are designed to work within a request/response processing model, as shown in FIG. 2B1. In this request/response model, a client subsystem 13 sends a request message to the Java Web Server 11' and the Server 11' responds by sending back a reply message. In the illustrative embodiment, requests come in the form of http, although is understood that the use of other protocols such as ftp, EDI or a custom protocol, may be possible in particular embodiments. The request and the corresponding response reflect the state of the client and the server at the time of the request.

When using a Java-enabled browser to view a Web page containing a server-side CPIR-enabling Applet tag <SERVLET>, the servlet's compiled class code is automatically accessed from the Java Web Server 11' and executed on the server-side of the network connection illustrated in FIG. 2B1. Thus, as shown in FIG. 2B1, the Java Web Server 11' must provide a Java Virtual Machine (JVM) for running/executing Java servlets on the server-side of the network in much the same way that a client browser must provide a JVM for running Java Applets on the client side thereof. Additionally, the Java Web browser 11' must also support the Java Servlet API, developed by JavaSoft, and define how and when the servlet communicates with the Java Web Server. Essentially, the Servlet API is a well-defined set of function calls (i.e. set of Java classes) to get information to and from the Java Web Server. The servlet needs to be able to access server-defined variables, issue redirects, send error messages and the like. Sun's Java Web Server supports the Servlet API and, of course, includes their JVM.

As shown in FIG. 2B1, the Java Web Server 11' includes a number of software components including the Java Servlet API which comprises several Java interfaces and fully defines the link between the hosting server (e.g. Java Web Server) and the servlets located at the middle tier. The Servlet API is defined as an extension to the standard JDK. This means that there is an explicit definition of servlet interfaces, but it is not part of the Java Development Kit (JDK) 1.1 or the Java 2 platform. Instead, the servlet classes are delivered with the Java Servlet Development Kit (JSDK) version 2.0 from Sun (http://java.sun.com/products/servlet/). This JSDK version is intended for use with both JDK 1.1 and the Java 2 platform. There are a few significant differences between JSDK 2.0 and JSDK 1.0.

JDK extensions are packaged under javax—the root of the Java extension library tree. The Java Servlet API contains the following packages: Package javax.servlet; and Package javax.servlet.http dedicated to supporting HTTP protocol and HTML generation. The Servlet API provides a tight link between a server and servlets, allowing servlets to add new protocol support to a server. Essentially, any protocol (e.g. SMTP, POP, FTP, etc.) that follows a request/response computing model can be implemented by a servlet.

General servlet support is provided by the package "javax.servlet" which comprises the following components:

(1) Servlet: An interface that defines communication between a web server and a servlet. This interface defines the init( ), service( ), and destroy( ) methods (and a few others).

(2) ServletConfig: An interface that describes the configuration parameters for a servlet. This is passed to the servlet when the web server calls its init( )method. Note that the servlet should save the reference to the ServletConfig object, and define a getServletConfig( ) method to return it when asked. This interface defines how to get the initialization parameters for the context under which the servlet is running.

(3) ServletContext: An interface that describes how a servlet can get information about the server in which it is running. It can be retrieved via the getServletContext( ) method of the ServletConfig object.

(4) ServletRequest: An interface that describes how to get information about a client request.

(5) ServletResponse: An interface that describes how to pass information back to the client.

(6) GenericServlet: A base servlet implementation. It takes care of saving the ServletConfig object reference, and provides several methods that delegate their functionality to the ServletConfig object. It also provides a dummy implementation for init( ) and destroy( ).

(7) ServletInputStream: A subclass of InputStream used for reading the data part of a client's request. It adds a readLine( ) method for convenience.

(8) ServletOutputStream: An OutputStream to which responses for the client are written.

(9) ServletException: Should be thrown when a servlet problem is encountered.

(10) UnavailableException: Should be thrown when the servlet is unavailable for some reason.

Support for HTTP Servlets is provided by the package "javax.servlet.http" which comprises the following components:

(1) HttpServletRequest: A subclass of ServletRequest that defines several methods that parse HTTP request headers.

(2) HttpServletResponse: A subclass of ServletResponse that provides access and interpretation of HTTP status codes and header information.

(3) HttpServlet: A subclass of GenericServlet that provides automatic separation of HTTP request by method type. For example, an HTTP GET request will be processed by the service( ) method and passed to a doGet( ) method.

(4) HttpUtils: A class that provides assistance for parsing HTTP GET and POST requests.

The central abstraction in the Java Servlet API is the Servlet interface. All servlets implement this interface, either directly or, more commonly, by extending a class that implements it (e.g. such as the HttpServlet class). The Servlet interface declares but does not implement methods that manage the servlet and its communication with clients. The servlet writer will provide some or all of these methods when developing a CPIR-enabling servlet.

Having provided an overview on server-side CPIR-enabling Java Applets (i.e. Servlets) of the present invention and the support framework required thereby in a distributed-computing object oriented programming environment shown in FIG. 2B1, it is appropriate to now describe the method of creating, loading, distributing, embedding and executing server-side CPIR-enabling Java Applets in accordance with the principles of the present invention schematically illustrated in FIGS. 4E1, 4E2, 4F1 and 4F2.

As indicated at Block A1 in FIG. 4E1, the first step of the method involves using the Java Servlet API to write or otherwise author the source code for a server-side CPIR-enabling Java Applet for each UPN-specified consumer product registered in the UPN/URL Database Management Subsystem 9. In general, the source code for each server-side CPIR-enabling Java Applet (i.e. Servlet) will embody one or more of following items of information, namely: (i) the UPN of the particular product on which the CPI search is to be carried out and the search results thereof displayed; (ii) Java classes required for performing a UPN-directed search on the RDBMS Server 9 using one or more Java methods running natively on the Java Web Server 11', and producing a particular Java GUI for displaying the results obtained from the UPN-directed search; and (iii) license-related information specifying the terms and conditions of the CPIR-enabling Servlet license and the conditions under which the CPIR-enabling servlet shall operate.

Notably, such license-related information may specify: (1) one or more specific host domains from which a Web document containing the corresponding servlet tag may launch the CPIR-enabling servlet under a licensing program; (2) one or more general Internet domains (e.g. .com, .org, .gov, .int, .mil, .uk, etc.) from which a Web document containing the corresponding servlet tag may launch the CPIR-enabling servlet under a licensing program; (3) the time duration of the licensing period associated with the CPIR-enabling servlet; and (4) any other restrictions set by the associated manufacturer and/or retailer, and/or administrator of the consumer product information system hereof, that must be observed for a registered CPIR-enabled servlet to operate within a Web-document served from the registered Internet domain.

Notably, the Java source code for each CPIR-enabling Servlet will vary depending upon implementation. However, regardless of the particular implementation, it can be expected that each JDBC-supporting CPIR-enabling servlet when, for example, designed to search a (Oracle JDBC-supported) UPN/URL Database Server 11A for the UPC/URL list currently symbolically linked to a specified UPN and display the search results on the requesting client machine 13, will typically include Java source code specifying:

(1) the importable JDBC classes required by the CPIR-enabling Servlet;
(2) the importable Java classes to be used in the CPIR-enabling Servlet;
(3) the JDBC driver to be loaded for the Oracle-based UPN/URL Database;
(4) the connection strings to the UPN/URL Database;
(5) the CPI query to be executed on the UPN/URL Database, dependent on the UPN of the associated consumer product and possibly other search criteria and Servlet licensing conditions;
(6) the servlet tag, its graphical icon or alias to trigger execution of the Servlet and its associated CPI query;
(7) the CPI Search Result GUI to be displayed on the requesting client machine and its relative location to the associated Servlet tag; and
(8) the operations that will be carried out upon execution of the CPI query including
  Boolean search logic to be carried out upon initiation of the UPN-directed CPI search;
  if a new connection is required between Java Web Server and the UPN/URL Database;
  Loading the JDBC driver;
  Connecting to the UPN/URL Database;
  Creating a SQL statement based on the specified Boolean search logic and UPN;
  Executing the SQL query statement; and
  Dumping the search results to the CPI Search Result GUI.

In the embodiment depicted in FIG. 2B1, a UPN-encoded Servlet is used to replace a Common Gateway Interface (CGI) script and provide a way of searching the UPN/URL Database on RDBMS Server 11', with the advantage of increased speed and stability. In this instance, CPIR-enabling Servlets are accessed by the user as an HTML tag <SERVLET> embedded in an HTML document served to the client subsystem 13. For example, when the consumer selects the servlet tag (graphically encoded by an icon or image) in an HTML-encoded document, the linked servlet residing on the server-side of the network, is automatically executed, causing a UPN-directed search to be carried on the RDBMS server 9.

After writing/authoring the source code for the Applet, the CPIR-enabling Java servlet is ascribed a unique name such as, for example, "UPNXXXXXXYYYYYZ" for a 12 digit Uniform Product Code.

Reference can be made to the following technical publication for additional details on writing Java servlets, designing Java GUIs and the like: "Java Servlets and Serialization With RMI" (1999) by Scott McPherson, published by Sun Microsystems, Inc., of Palo Alto, Calif.; "The Java™ Tutorial Second Edition Object Oriented Programming For The Internet" (1999), by Mary Campione and Kathy Walrath, published by Sun Microsystems, Inc., of Palo Alto, Calif.; and "The JFC Swing Tutorial: A Java Guide To Constructing JAVA GUIs" (1999), by Mary Campione and Kathy Walrath, published by Sun Microsystems, Inc., of Palo Alto, Calif.; "JAVA" (1997) by Ed Tittel and Bill Brogden, published by IDG Books Worldwide, Inc.; "Wilde's WWW: Technical Foundations of the World Wide Web" (1999) by Erik Wilde, published by Springer-Verlag, Berlin, Heidelberg; each said publication being incorporated herein by reference.

As indicated at Block A2 in FIG. 4E1, the source code for the authored servlet is compiled into Java bytecode, and java bytecode for the servlet classfiles are placed in the server_root/servlets directory on the Java Web Server 11'. When compiling, the javax.servlet.* package should be placed in the classpath. The easiest way to do this is to include server_root/lib/classes.zip in the classpath, but it is understood that one must look to the compiler's documentation for specific details in this regard.

As indicated at Block B1 in FIG. 4E1, the second step of the method involves using the Java Server Administration Applet to configure the Java Web Server so as to extend the functionalities thereof and embody (or install) the CPIR-enabling Java servlet within the Java Web Server 11'. This process of extending the functionalities of the Java Web Server 11' involves specifying the default parameters and arguments thereof. This configuration step is carried out when using the Servlet Loading facility of the Administration Applet in order. The loading process is achieved by clicking on the Servlets button, and then selecting "Add" from the list of choices on the left GUI of the Servlet Loading Facility. Thereafter, to add a new servlet, the following procedure is performed: enter in the Servlet Name field, the unique name for the CPIR-enabling Java servlet one is loading onto the Java Web Server (e.g. "UPNXXXXXXYYYYYZ"); enter in the Servlet Class field, a valid class name for the Java class of the CPIR-enabling servlet, i.e., the full package name, e.g. "sun.server.http.FileServlet"; and thereafter click on the "Add" button.

As indicated at Block B2 in FIG. 4E1, the fourth step of the method involves invoking the CPIR-enabling Java servlet by creating a URL having the path section "/servlet/" prepended to the assigned Servlet Name, so that the URL can be thereafter embodied within the servlet HMTL tag <SERVLET>, prior to its insertion within the HTML code of a Web document. To invoke a servlet, the webmaster/administrator calls the servlet by creating a URL with "/servlet/" prepended to the servlet name. One can confirm that the servlet is correctly invoked by entering this URL into ones Web browser and analyzing the output of the created servlet.

As indicated at Block B3 in FIG. 4E1, the fifth step of the method involves (1) embodying the unique URL, created for each consumer product, within a CPIR-enabling servlet HTML tag <SERVLET>, (2) containing each such servlet HMTL tag within an executable file, and (3) storing each such servlet tag containing file in the Central CPIR-Enabling Applet Library on the RDBMS Server 9.

As indicated at Block C in FIG. 4E2, the sixth step of the method involves distributing the CPIR-enabling servlet HMTL tags (within the Central CPIR-enabling Applet Library) to retailers, wholesalers, advertisers, and others who desire to deliver UPN-directed CPI search results to their customers, clients and the like. This distribution process can be carried out by downloading servlet tag containing files to a remote computer system connected to the Internet using, for example, ftp or other electronic data or document interchange protocols (e.g. XML/ICE) to carry out the servlet tag transport process. These downloaded CPIR-enabling servlet tags can then be stored in a local CPIR-Enabling Applet/Servlet Library maintained on a client computer 13, as shown in FIG. 4F2, until it is time to embed the same into a particular HTML-encoded document.

As indicated at Block D in FIG. 4E2, the seventh step of the method involves enabling retailers, wholesalers, advertisers, and others to (1) open the downloaded servlet tag containing files, (2) extract the CPIR-enabling servlet tags contained therewithin, and (3) embed (i.e. insert) one or more distributed CPIR-enabled servlets HMTL tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may, understandably, include other types of codes (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™ and Catalog-Manager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling servlet tag <SERVLET> using, for example, simple commands or drag-and-drop procedures.

As indicated at Block E in FIG. 4E2, the eighth step of the method involves serving "servlet-tag" encoded HTML documents from Internet information servers to Java-enabled client computer subsystems 13 operated by consumers at home, in the office, in EC-enabled or "brick and mortar" retail stores, or on the road, as the case may be. As shown in FIG. 4F, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4E2, the ninth step of the method hereof involves using a Java-enabled client computer subsystem 13 to display served HTML-encoded documents having one or more of CPIR-enabling servlet tags embedded therewithin. This step is carried out by the consumer pointing his or her Java-enabled browser program (e.g. Netscape Navigator, Microsoft Explorer, or Sun Microsystems' HotJava program) to an HMTL-encoded document within which a CPIR-enabling Java servlet tag is embedded, at a particular point of presence on the WWW.

In practice, the HTML tags of CPIR-enabling Servlets can be graphically-encoded in a variety of different ways to provide the consumer with a visual indication that, clicking on the graphical object however manifested, will automatically result in a consumer product information search on a particular product identified by the UPN encoded within the associated servlet. In view of the fact the CPIR-enabling servlet tags are distributed over the Internet and inserted within HTML documents by others than the servlet author, at some future date, graphical encoding of CPIR-enabling servlets will typically occur at the time of writing the servlet.

With the above point in mind, it will be helpful to adopt a standardized icon for graphically indicating the presence of a CPIR-enabling servlet tag within an HTML document. In the illustrative embodiments shown in FIGS. 6A, 6B, 7A and 7B, small predefined images of servicemarks such as "GO: UPC Request Cyber-Service™ URL Search" are served to inform the consumer that the Java object, if selected from the displayed Web page, will automatically cause a product-specific URL search to be performed with respect to the particular consumer product and the results thereof displayed at the "point of presence" of the consumer who may be residing at a particular point in an EC-enabled store (e.g. at the check-out display screen or POS), at an on-line auction site, at a Web-based product advertisement, or anywhere else on the WWW. Notably, an important advantage provided by this information search technique of the present invention is that it does not disturb the consumer at his or her point of presence (or sale), where ever that may be. Instead, the CPI search and display method hereof enables the delivery of accurate product-specific manufacturer-defined information at precise points in Cyberspace by performing a single mouse-clicking operation. This enables consumers to make informed decisions thereat based on the information displayed in the corresponding Java GUI generated upon launching a CPIR-enabling servlet at the consumer's point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at the consumer's point of presence.

One alternative technique would be to embed within the CPIR-enabling Applet, a thumb-nail or large size photo-image of the consumer product being offered for sale, lease, auction, or other purpose on the WWW. Notably, this product image may reside on the RDBMS server 9, or on the http server from which the HTML encoded document is served. Using this technique, the consumer need only click on the image to initiate a UPN-directed consumer product information search against the UPN/URL Database Management Subsystem 9 hereof.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12', 12A or 12B), and managed using a Web-enabled client subsystem 13, as shown in FIG. 4F1. Using the OAS 5.0 advertisement management solution, and the CPI search and display method of the present invention described above, a webmaster or advertising manager assigned to a particular Internet information server (12, 12', 12A or 12B) can: (1) access the Web-based product advertisement for a particular product (i.e. HTML code, image files, and any other rich media content associated therewith); (2) access previously downloaded CPIR-enabling Java servlet(s) for the consumer product, stored in a locally-maintained "Library (i.e. Catalog) of CPIR-Enabling Applets" on a client machine or server on the network, or directly access CPIR-enabling Java servlets from the centrally-maintained "Library (i.e. Catalog) of CPIR-Enabling Applets" illustrated in FIG. 4F1, via the Java Web Server 11'; and (3) use Real Media's OAS 5.0 solution software deliver both the Web-based product advertisement (i.e. its HTML code and other media-rich content) and the corresponding CPIR-enabling Applet tag (and possibly any image files associated therewith) to a designated section on a particular Web page of a specific WWW site.

It is understood that there are different ways of inserting/embedding both of these objects within a particular section of an HTML-encoded document using the highly-advanced HTML-editing functionalities of the OAS 5.0 software system. For example, the Web-based product advertisement can be inserted within a first spatially-defined portion of the target HTML document (occupying the largest portion of the purchased Internet advertising space), while the CPIR-enabling server-side Applet (i.e. servlet) is inserted within a second spatially-defined portion of the target HTML document occupying the balance of the purchased Internet advertising space. Alternatively, both the CPIR-enabling Applet and the Web-based product advertisement can be inserted within substantially the same spatially-defined portion of the target HTML document so as to achieve spatial overlap therebetween. This way when the consumer clicks on the advertisement image, or some preselected portion thereof, the underlying CPIR-enabling servlet will be automatically executed and the corresponding Java GUI generated for displaying the results of the UPN-directed database search.

In situations where the Internet product advertisement (e.g. banner advertisement) embodies a servlet HMTL tag which, when executed, produces a new Java GUI (i.e. new browser interface), then a CPIR-enabling servlet can be embedded within the HTML-encoded document displayed in the new Java GUI. This servlet tag embedding technique will be useful in many applications where the display space allocated for the Web advertisement in the target HTML-encoded document is limited, and there is a need to generate a new Java GUI for presenting the content of the advertisement.

Other ways of embedding the Web-based advertisement and the related CPIR-enabling servlet tags will become apparent hereinafter to those skilled in the art, having had the benefit of reading the present disclosure.

As indicated at Block G in FIG. 4E2, the tenth step in the method involves the consumer recognizing that a CPIR-enabling servlet tag is embedded within a Web-document displayed on a Java-enabled client computer subsystem, and thereafter launching/executing the associated servlet to initiate a UPN-directed consumer product information search within the RDBMS server 9.

Notably, the above illustrative embodiment has been described with particular focus given to CPIR-enabling servlets encoded with the UPN of a particular consumer product. It is understood, however, that the CPIR-enabling servlets of the present invention can be encoded with the trademark(s) used in connection with a particular consumer product, thus providing Trademark-encoded CPIR-enabling servlets, in contrast with UPN-encoded CPIR-enabling servlets. In such alternative embodiments, the encoded trademark would be used to direct a search through the RDBMS server 9, and display the results thereof in a new (independent) Java GUI generated at the point of servlet tag embodiment. Alternatively, a product descriptor associated with a particular product can be encoded within the corresponding CPIR-enabling servlet, used to direct a search through the RDBMS server 9, and display the results thereof in an independent Java GUI generated at the point of servlet tag embodiment.

In situations where the advertisement itself embodies a Java-Applet, as in the case of most banner-type advertisements, it would be desirable to embed the CPIR-enabling Applet within the HTML-encoded document displayed within the new Java GUI generated when the Java-Applet is executed by the consumer upon his or her initial encounter of the advertisement. Upon the display of the menu-formatted list of categorized URLs within the CPID-enabling Java GUI, the consumer can easily access different Web-documents containing information related to the advertised consumer product by simply selecting the URL and linking to the information resource to which it points on the WWW. Notably, the displayed URL menu would include (i) one or more URLs pointing to EC-enabled stores and on-line catalogs at which the advertised product can be purchased over the Internet, as well as (ii) one or more URLs pointing to "brick and mortar" type retail stores at which the advertised product can be purchased in the stream of commerce.

Thus, the CPI-based search and display method of the present invention gives rise to a new method of and system for purchasing a consumer product over the Internet (e.g. WWW) comprising the steps of: embedding a UPN-encoded CPIR-enabling Applet within the HTML-code of a consumer product advertisement, wherein the CPIR-enabling Applet when executed displays a categorized URL menu containing one or more URLs pointing to one or more EC-enabled stores or on-line catalogs on the WWW at which the consumer product identified by the encoded UPN can be purchased and delivered to a particular address in physical space.

CPIR-Enabling Applet Download/Distribution

As illustrated in FIGS. 4F1 and 4F2, a centralized Library of CPIR-enabling Servlets is created, management and stored within the UPN/URL Database Management Subsystem 9 hereof in accordance with the above-described methods. In accordance with the principles of the present invention, these CPIR-enabling Applets (i.e. Servlets) must be widely distributed to retailers, manufacturers, advertisers and others about the globe and thereafter widely embedded within HTML-encoded documents, as taught in detail hereinabove, to practice this aspect of the present invention in a commercially successful manner. The function of the CPIR-enabling Applet Download/Distribution mode of operation of the system is to enable the world-wide distribution of this centralized Library of CPIR-enabling Applets/Servlets, in accordance with the licensing program associated with each such CPIR-enabling Applet.

A CPIR-enabling Applet Download/Distribution can be automatically initiated by the user depressing mode control button displayed on a control panel. The user can be anyone with the requisite authority to use the Applets in accordance with the terms of the licensing program to be enforced in connection therewith. Understandably, the terms of such licensing programs will be based on prevailing business conditions and will vary from embodiment to embodiment of the present invention.

Figure 5:
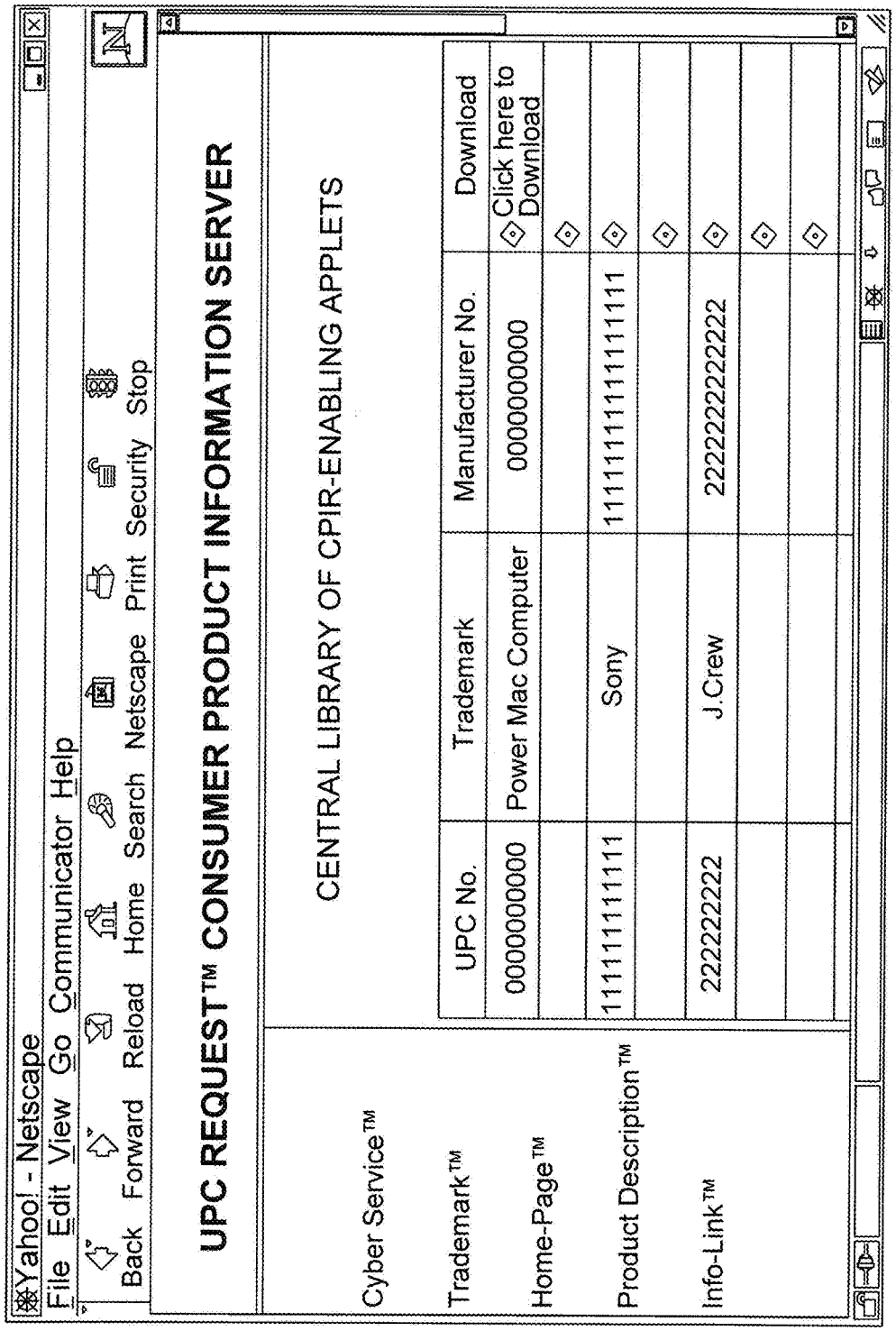
FIG. 5 is a graphical illustration of an Internet browser display screen that might be displayed on a client computer subsystem hereof while browsing the Library of CPIR-Enabling Java Applets (HMTL tags) maintained within the UPN/URL RDBMS shown in FIGS. 2-1 through 2A, wherein the user (e.g. retail purchasing agent, product catalog manager, advertising agent, or whomever) is provided with the option of viewing and downloading, for each UPN-specified product in the system, an executable file containing the HTML tag for either a client-side or server-side type CPIR-enabling Java Applet associated therewith.
Figure 6A:
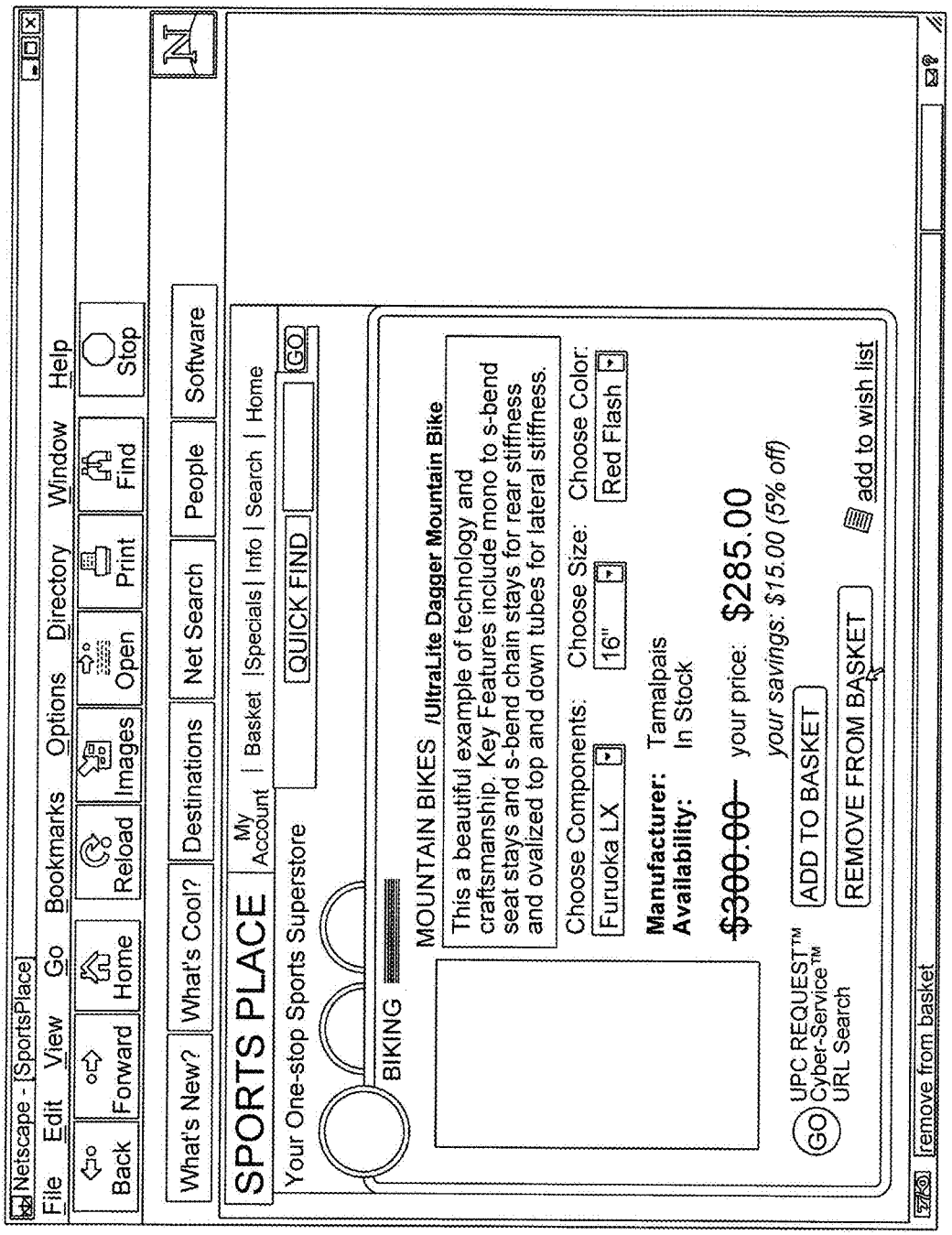
FIGS. 6A and 6B set forth graphical illustrations of Internet browser display screens that might be displayed on a client computer subsystem hereof while shopping/browsing at a particular catalog page in an EC-enabled store, considering whether or not to make an on-line purchase of a particular consumer product displayed on the catalog page; and then initiating a UPN-directed CPI search according to the principles of the present invention by clicking on the HMTL tag of a UPN-encoded client-side or server-side Applet embedded within the HTML code of the displayed catalog page.
Figure 6B:
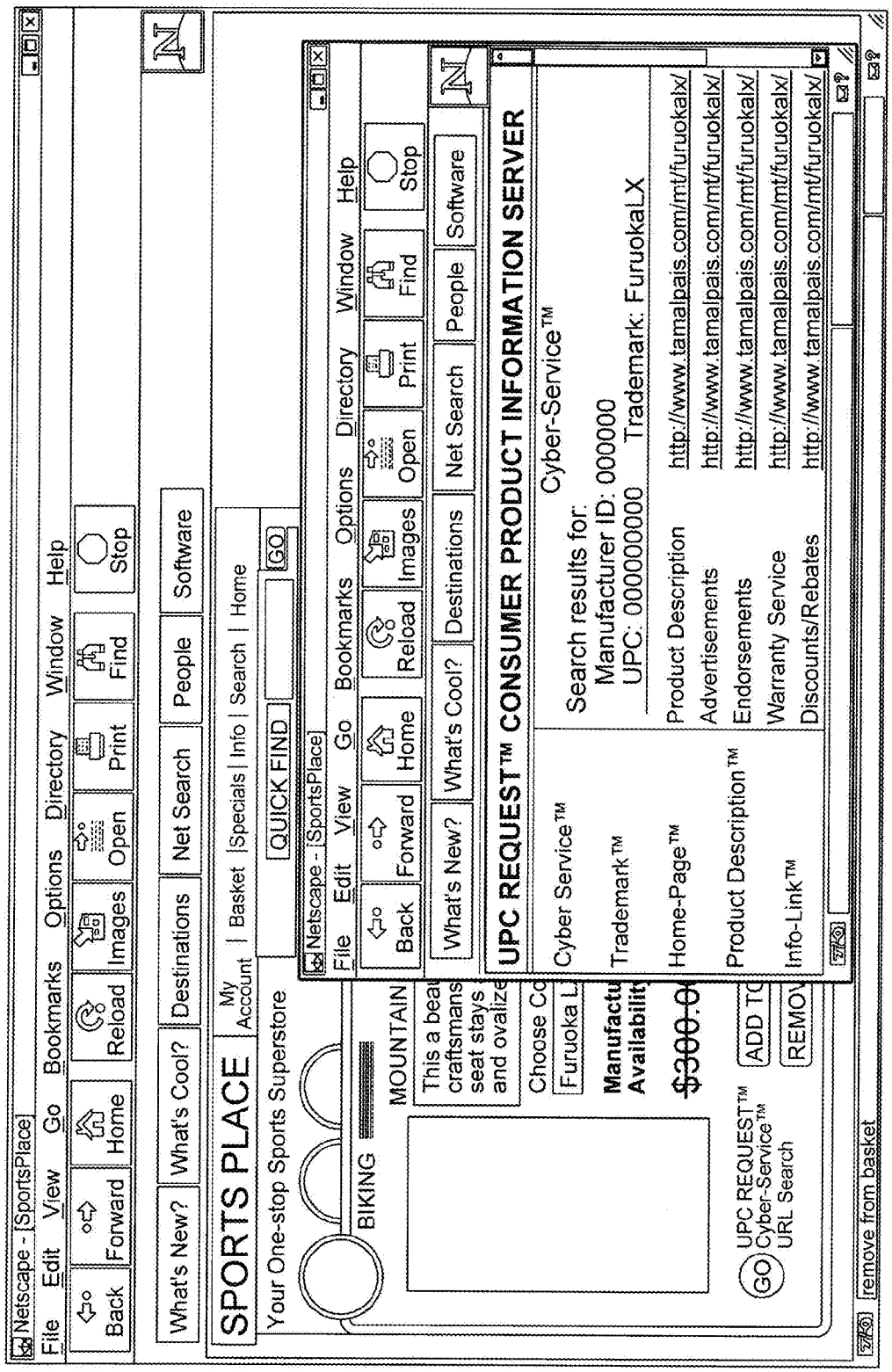
Figure 7A:
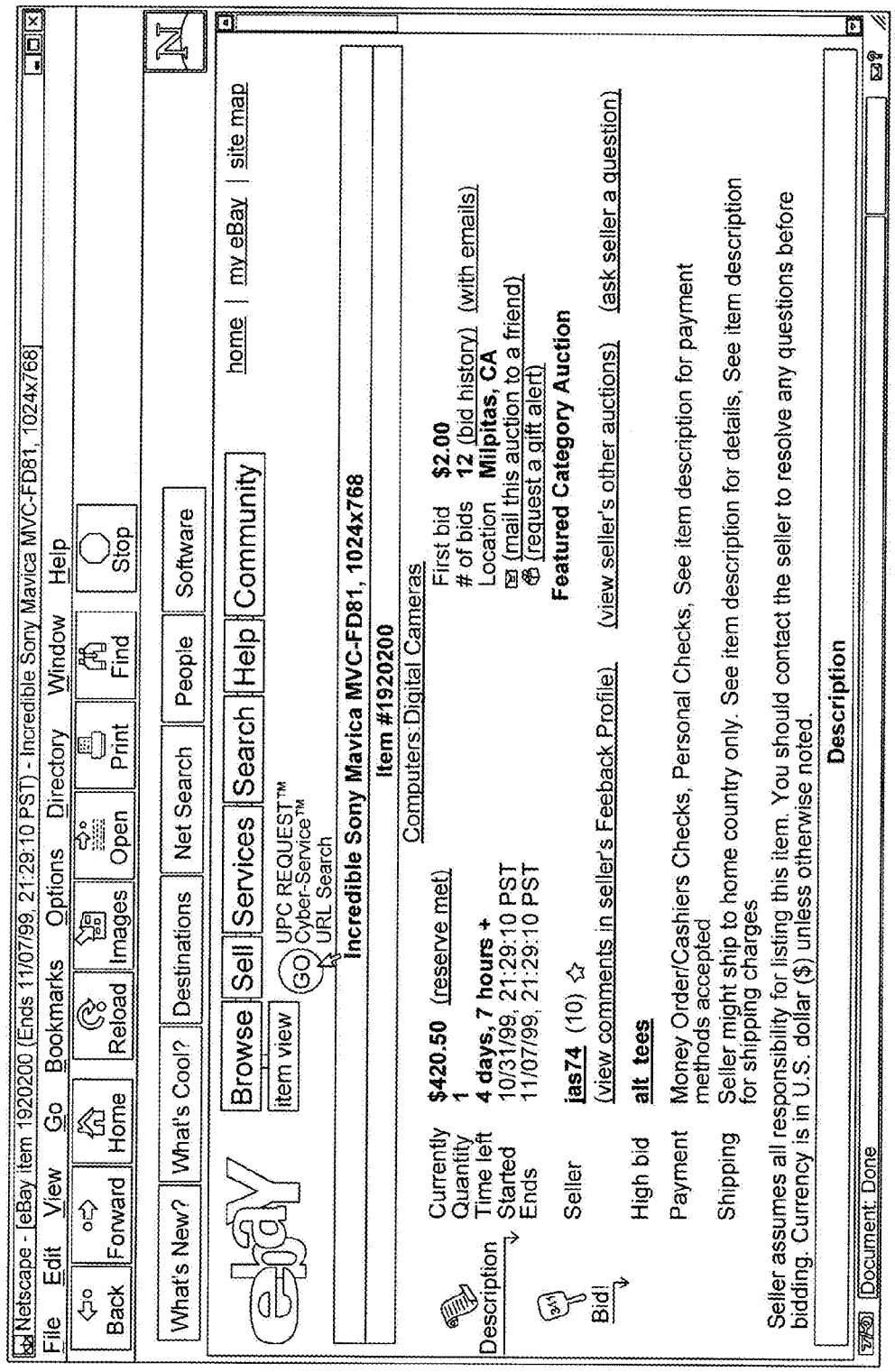
FIGS. 7A and 7B set forth graphical illustrations of Internet browser display screens that might be displayed on a client computer subsystem hereof while shopping/browsing at a particular auction page in the EC-enabled auction site, considering whether or not to place a bid on a particular product being auctioned; and then initiating a UPN-directed CPI search according to the principles of the present invention by clicking on the HMTL tag of a UPN-encoded client-side or server-side Applet embedded within the HTML code of the displayed auction page.
Figure 7B:
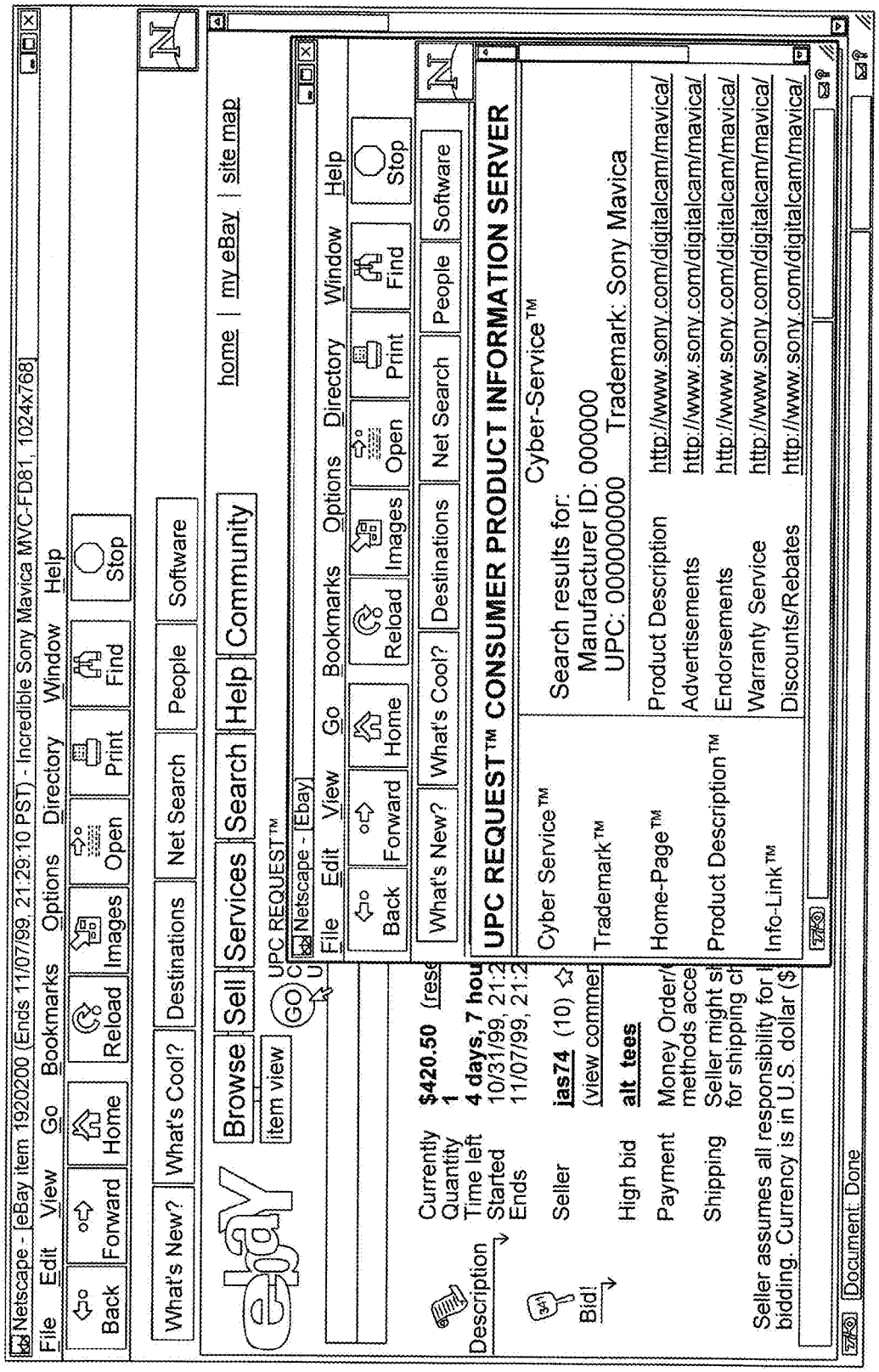

As best illustrated in FIG. 4F2, upon entering the CPIR-enabling Applet Download/Distribution mode, the IPD server 11 of the illustrative embodiment will serve a custom Java GUI as shown in FIG. 5, for carrying out Applet tag downloading and licensing procedures. The GUI will provide (1) links to the centralized Library of CPIR-Enabling Applet maintained within the UPN/URL Database Management Subsystem 9, as well as (2) launchable GUIs for downloading selected UPN-identifiable CPIR-enabling Applets to specified Internet-enabled client computer subsystems 13 or Internet information/application servers operated by the user interfacing with this mode of system operation. Notably, electronic data interchange/exchange processes (e.g. based on EDI, XML/ICE or other protocols) can be used to carry out the downloading of CPIR-enabling Applets and other files between client computers and the IPD server 11 during this and other modes of operation.

For licensing purposes, it may be desirable or necessary to have the user supply "end-use" types of information to the IPD server 11 during this mode of operation in order to identify on which information servers or domains particular CPIR-enabling Applets are to be used (i.e. embedded within HTML-documents and launched therefrom by the end-user which will typically be the consumer). In some instances, licenses for CPIR-enabling Applets will carry a fee to be paid by the downloader; in other instances, there will be no fee requirements. Such details will depend on prevailing business conditions along the retail supply and demand chain.

Once a user has downloaded CPIR-enabling Applets onto a designated (target) client machine or server, the user will have built a local Library (or Catalog) of CPIR-enabling Applets for use during Applet embedding operations which will typically be carried out alongside of other HTML-code authoring and management operations involving, for example, the design, construction, management and maintenance of Web-pages, EC-stores, on-line (retail and wholesale) product catalogs, on-line auction site pages, Web advertisements, and the like.

As shown in FIG. 4F2, during Step D1 of the Applet embedding process, CPIR-enabling requests are accessed from the local Library of CPIR-enabling Applets typically over an IP-type local area network (LAN) or wide area network (WAN). Then during Step D2, the accessed CPIR-enabling Applet is inserted within the HTML code of the target document. This step of the process will typically involve use of HTML-editing tools of one sort or another, as discussed herein above.

Once the CPIR-enabling Applet has been embedded within the target HTML-encoded documents, the HTML-encoded document can then be published in its intended publishing environment so that consumers can instantly initiate UPN-directed searches within the centralized UPN/URL Database Management Subsystem 9 hereof by clicking on the CPIR-enabling Applet, and thereafter display the search results within an independent Java GUI which performs the function of a "cyber-kiosk" provided at the consumer's point of presence on the WWW.

Modifications of the Illustrative Embodiments of the Invention

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPD Server for (i) registered products within the system, and (ii) non-registered products within the system. Notably, the reasons for using a dual database design of this sort would be based largely on economics, namely: only those companies who have paid the required maintenance (or registration) fees get their products and linked-URLs "registered" with the system, whereas non-paying companies and organizations do not get their products and linked-URLs registered with the system, regardless of how such product-URL information is ascertained (e.g. by solicitation versus data-mining).

Thus it is contemplated that in some embodiments of the present invention, each IPD Server will be designed to maintain only a single database for maintaining product-URL information currently available on the Internet. In such embodiments of the present invention, the concept of "non-registered" products will be altogether avoided, since the system implementation and administration may be designed not to require companies to pay maintenance (or registration) fees in order that their products and linked URLs are registered with the IPI system. Instead, some alternative income producing scheme will be used in such embodiments of the present invention (e.g. user fees, subscription fees, Internet browser-licensing fees, etc.) for system maintenance and administration.

When practicing the system and method of the present invention, it is preferred that the UPC label (with its human-readable UPC number) assigned to the particular product be attached, embossed or otherwise embodied on an accessible surface thereof. In addition to applying the UPC label to the external packaging of the product, it is preferred that the UPC label also be printed on any and all product instructions and manuals provided with the product. In this way, the UPC number can be easily read by a human being and then used to access a desired type of product information using the system and method of the present invention.

In order that the system hereof can be used to find information pertaining to large products such as automobiles, motorcycles, skidoos, farm machinery, boats, etc., the present invention also contemplates assigning UPNs (e.g. UPC or EAN numbers) to such products and attaching, embossing or otherwise embodying the same on an accessible surface thereof. Also, the UPN label can be printed on all instruction booklets and/or operating manuals normally provided with the product. In this way, information related to any particular product that is posted anywhere on the Internet and linked to URLs registered with the IPD Servers 11 of the system hereof can be readily found using the uniquely assigned UPC number assigned thereto by the manufacturer at the time of sale. Notably, multimedia information about such products can be most helpful in regard to the operation, repair and servicing of such products.

The system and method of the present invention has been shown to combine the use of UPNs, trademarks and company names when making a product information request of the system. It is understood, however, that the present invention can be practiced using any one of these items of information, alone or in combination with each other, in order to place a product information request with the system hereof.

Also, while the system of the illustrative embodiment has been shown used to collect, transport and serve information related to consumer products, it is understood that the system can be used to link the URLs of HTML (and other Internet) documents with consumer services assigned uniform service numbers (USN) which may be based on the UPC or EAN numbering system, or some other suitable system. In such alternative embodiments, the IPI Database would contain information pertaining to uniform service numbers (USN) that have been linked to the URLs of HTML or like documents on the Internet by the manufacturer or its agents, in essentially the same manner conducted for consumer products. Such USN/URL management operations can be carried out in a manner similar to that described in connection with UPN/URL management along the retail supply and demand chain.

In connection with the consumer service information embodiment of the present invention, it is understood that at present, few (if any) services have been assigned a UPC (or EAN) number in the manner that nearly all consumer products have been assigned in the contemporary period. In spite of this fact, however, the present invention contemplates the need and utility of widespread assignment of UPC, EAN or similar numbers by service providers to particular services (as well as the imprinting of UPC, EAN or similar symbols on printed service brochures and advertisements. Notably, assigning uniform service numbers (USNs) to particular services, and labeling printed and graphical brochures and advertisements with such universal numbers, will provide a number of new opportunities hitherto unavailable.

In particular, service-related information could be easily found (i.e. located and accessed) on Web-sites using the system and method of the present invention, and thereafter the service easily procured through an electronic data transaction. In accordance with the present invention, this can be achieved by uniquely identifying and assigning "particular" services by a Universal Service Code (USC) which has many if not all of the attributes of a conventional UPC. While not necessary, a single digit may be optionally added to the USC in order to demark that services, rather than products, are being identified. An example of such USC labeling would be printing an assigned UPC label (number) on: admission tickets to a theatrical, dramatic or musical performance and/or its playbill; admission tickets to a movie; admission tickets to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the IPSI Registrant Database of the system hereof, along with the name of the provider of the service, and a list of URLs that identify the Web locations at which particular kinds of information related to the particular service can be found (in accordance with the categories of FIG. 4A2).

These and all other such modifications and variations are deemed to be within the scope and spirit of the present invention as defined by the accompanying Claims to Invention.

What is claimed is:

1. An Internet-based system for managing and delivering consumer product information to consumers at points of presence along the World Wide Web (WWW), said Internet-based system comprising:

a plurality of Web-based information servers, operably connected to the infrastructure of the Internet, serving a plurality of Web-sites on the WWW, wherein each said Web-site includes a plurality of HTML-encoded documents;

a plurality of Internet-based consumer product information (CPI) servers, operably connected to the infrastructure of the Internet, and serving a plurality of consumer product information (CPI) resources located on the WWW having information content, and related to a particular consumer product or group of consumer products registered with said Internet-based system and being marketed along the WWW;

a first Internet-based subsystem, operably connected to the infrastructure of the Internet, and configured to allow manufacturer team members associated with said particular consumer product or group of consumer products, and/or authorized parties, to implement a plurality of consumer product information (CPI) requesting and graphical user interface (GUI) displaying subsystems for said plurality of consumer products being marketed along the WWW, so that each said CPI-requesting and GUI-displaying subsystem is accessed by consumers at points of presence along the WWW, using a client subsystem supporting a Web browser;

an object-oriented server operably connected to the infrastructure of the Internet;

wherein each said CPI-requesting and GUI-displaying subsystem is implemented by (i) a consumer product information request (CPIR) enabling object stored on and executed within said object-oriented server independent of the operation of said Internet-based CPI servers, and (ii) an HTML tag embodied with a unique URL referencing said CPIR-enabling object, and embedded within at least one of said plurality of HTML-encoded documents at a point of presence on the WWW;

wherein said object-oriented server generates each said CPI-requesting and GUI-displaying subsystem and serves a CPI graphical user interface (GUI) at the point of presence, for displaying a set of said plurality of CPI resources for selection by the consumer;

a database, operably connected to said object-oriented server, and storing and managing a link structure for each consumer product registered with said Internet-based system, wherein each said link structure includes a product identifier assigned to the consumer product registered within said Internet-based system, and a set of URLs for a set of said plurality of CPI resources being served from said plurality of Internet-based CPI servers;

wherein said CPIR-enabling object installed on said object-oriented server, for each said consumer product, includes code stored on a medium operable to execute on the object-oriented server, and specifying:

(i) a connection to said database;

(ii) a CPI query to be executed on said database, dependent on the product identifier assigned to said consumer product, and returning a set of URLs stored in said database and associated with said product identifier; and (iii) a CPI GUI, object-oriented controlled, displaying the results of the product identifier dependent CPI query at the point of presence where said corresponding HTML tag is embedded within at least one said HTML-encoded document along the WWW;

wherein said HTML tag embodies the unique URL referencing said corresponding CPIR-enabling object;

a second Internet-based subsystem configured to allow manufacturer team members associated with a particular consumer product or group of consumer products, and/or authorized parties, to program said set of CPI resources for display in the CPI GUI of each said CPI-requesting and GUI-displaying subsystem; and wherein, upon the Web-browser of the consumer encountering said HTML tag installed in said HTML-encoded document,
  (a) the CPIR-enabling object corresponding to the HTML tag is automatically executed,
  (b) the CPI GUI of the corresponding CPI-requesting and GUI-displaying subsystem is automatically generated by said object-oriented server,
  (c) said object-oriented controlled CPI GUI is served to the Web browser at the point of presence where said HTML tag is embedded, and
  (d) then said object-oriented controlled CPI GUI displays information content that is (i) associated with one or more CPI resources having URLs returned by said product identifier dependent CPI query, and (ii) served from one or more of said plurality of Internet-based CPI servers, for display and review by the consumer at the point of presence along the WWW where said HTML tag has been encountered by the Web browser.

2. The Internet-based system of claim 1, wherein each said product identifier comprises a Universal Product Code (UPC).

3. The Internet-based system of claim 1, wherein, for each consumer product, said link structure further comprises:
  a Trademark (TM) assigned to the consumer product; and
  a Product Descriptor (PD) associated with the consumer product.

4. The Internet-based system of claim 1, wherein said set of CPI resources are selected from the group consisting of product videos, audio files, product images, product specifications, product advertisements, and product promotions.

5. The Internet-based system of claim 1, wherein said second Internet-based subsystem is further configured to allow manufacturer team members associated with a particular consumer product or group of consumer products, and/or authorized parties, to program said set of CPI resources for display in the CPI GUI of each said CPI-requesting and GUI-displaying subsystem, by creating and managing said link structure for each said consumer product.

6. The Internet-based system of claim 1, wherein each said HTML-encoded document is selected from the group consisting of Web-pages, product images, product documents, and graphical icons.

7. The Internet-based system of claim 3, wherein said product identifier, said Trademark (TM) and said Product Descriptor (PD) associated with each said link structure are imported into said database from a supply-chain information management system, using electronic file transfer techniques.

8. The Internet-based system of claim 1, wherein said client subsystem supporting said Web browser is a computing machine selected from the group consisting of a desktop computer, a portable computer, a portable digital assistant (PDA), and physical retail kiosk.

9. The Internet-based system of claim 1, wherein said Web browser of the consumer encountering one said HTML tag, further comprises the consumer clicking on a graphical component at which said HTML tag is embedded in said HTML-encoded document.

10. The Internet-based system of claim 1, wherein said authorized parties include agents of the manufacturer.

11. The Internet-based system of claim 1, wherein each said set of CPI resources is arranged within a consumer product information menu, within said CPI GUI, for selection by consumers using said Web browser.

12. The Internet-based system of claim 1, wherein said HTML tag is embedded within a graphical object within said HTML-encoded document; and wherein, upon the Web-browser of the consumer encountering said graphical object,
  (i) said object-oriented server automatically executes the CPIR-enabling object corresponding to the HTML tag, and generates the CPI GUI of the corresponding CPI-requesting and GUI-displaying subsystem,
  (ii) said object-oriented controlled CPI GUI is served to the Web browser at the point of presence where said HTML tag is embedded, and
  (iii) said object-oriented controlled CPI GUI displays information content that is associated with one or more CPI resources having URLs returned by said product identifier dependent CPI query, and served from one or more of said plurality of Internet-based CPI servers, for display and review by the consumer at the point of presence along the WWW where said HTML tag has been encountered by the Web browser.

13. The Internet-based system of claim 1, wherein said object-oriented server is a Java server, and each said CPIR-enabling object is a Java-implemented CPIR-enabling object loaded within said Java server.

14. The Internet-based system of claim 1, wherein said database is a relational database management system (RDBMS).

15. A method of managing and delivering consumer product information to consumers enabling the purchase of consumer products at points of presence along the World Wide Web (WWW), said method comprising the steps of:
  (a) serving a plurality of Web-sites from a plurality of Web-based information servers, operably connected to the infrastructure of the Internet, wherein each said Web-site includes a plurality of HTML-encoded documents;
  (b) serving a plurality of consumer product information (CPI) resources from a plurality of Internet-based consumer product information (CPI) servers, operably connected to the infrastructure of the Internet, wherein each said CPI resource has information content related to a particular consumer product or group of consumer products registered with said Internet-based system and being marketed along the WWW;
  (c) operably connecting a first Internet-based subsystem to the infrastructure of the Internet, and allowing manufacturer team members associated with said particular consumer product or group of consumer products, and/or authorized parties, to use said first Internet-based subsystem to implement a plurality of consumer product information (CPI) requesting and graphical user interface (GUI) displaying subsystems for said plurality of consumer products being marketed along the WWW, so that each said CPI-requesting and GUI-displaying subsystem is accessible by consumers at points of presence along the WWW, using a client subsystem supporting a Web browser;
  (d) operably connecting an object-oriented server to the infrastructure of the Internet and said first Internet-based subsystem;
  wherein each said CPI-requesting and GUI-displaying subsystem is implemented by (i) a consumer product information request (CPIR) enabling object stored on and executed within said object-oriented server independent of the operation of said Internet-based CPI servers, and (ii) an HTML tag embodied with a unique URL referencing said CPIR-enabling object, and embedded within at least one of said plurality of HTML-encoded documents, at a point of presence on the WWW;

(e) operably connecting a database to said object-oriented server, for storing and managing a link structure for each consumer product registered with said Internet-based system, wherein each said link structure includes a product identifier assigned to the consumer product registered within said Internet-based system, and a set of URLs for a set of said plurality of CPI resources being served from said plurality of Internet-based CPI servers;

wherein said CPIR-enabling object stored on said object-oriented server, for each said consumer product, includes code stored on a medium operable to execute on the object-oriented server, and specifying:

(i) a connection to said database;

(ii) a CPI query to be executed on said database, dependent on the product identifier assigned to said consumer product, and for returning a set of URLs stored in said database and associated with said product identifier; and (iii) a CPI GUI, object-oriented controlled, for displaying the results of the product identifier dependent CPI query at the point of presence where said corresponding HTML tag is embedded within at least one said HTML-encoded document along the WWW;

wherein said HTML tag embodies the unique URL referencing said corresponding CPIR-enabling object;

(f) operably connecting a second Internet-based subsystem to the infrastructure of the Internet, and allowing manufacturer team members associated with a particular consumer product or group of consumer products, and/or authorized parties, to use said second Internet-based subsystem to program said set of CPI resources for display in the CPI GUI of each said CPI-requesting and GUI-displaying subsystem; and (g) upon the Web-browser of the consumer encountering said HTML tag installed in said HTML-encoded document, (i) the CPIR-enabling object corresponding to the HTML tag is automatically executed, (ii) the CPI GUI of the corresponding CPI-requesting and GUI-displaying subsystem is automatically generated by said object-oriented server, (iii) said object-oriented controlled CPI GUI is served to the Web browser at the point of presence where said HTML tag is embedded, and (iv) then said object-oriented controlled CPI GUI displays information content that is associated with one or more CPI resources having URLs returned by said product identifier dependent CPI query, and (v) served from one or more of said plurality of Internet-based CPI servers, for display and review by the consumer at the point of presence along the WWW where said HTML tag has been encountered by the Web browser.

16. The method of claim 15, wherein each said product identifier comprises a Universal Product Code (UPC).

17. The Internet-based system of claim 15, wherein said Web browser of the consumer encountering one said HTML tag, further comprises the consumer clicking on a graphical component at which said HTML tag is embedded in said HTML-encoded document.

18. The Internet-based system of claim 15, wherein each said set of CPI resources is arranged within a consumer product information menu, within said CPI GUI, for selection by consumers using said Web browser.

19. The Internet-based system of claim 15, wherein said HTML tag is embedded within a graphical object within said HTML-encoded document; and wherein, upon the Web-browser of the consumer encountering said graphical object, (i) said object-oriented server automatically executes the CPIR-enabling object corresponding to the HTML tag, and generates the CPI GUI of the corresponding CPI-requesting and GUI-displaying subsystem, (ii) said object-oriented controlled CPI GUI is served to the Web browser at the point of presence where said HTML tag is embedded, and (iii) said object-oriented controlled CPI GUI, displays information content that is associated with one or more CPI resources having URLs returned by said product identifier dependent CPI query, and served from one or more of said plurality of Internet-based CPI servers, for display and review by the consumer at the point of presence along the WWW where said HTML tag has been encountered by the Web browser.

20. The method of claim 15, wherein each said HTML-encoded document is selected from the group consisting of Web-pages, product images, product documents, and graphical icons.

21. An Internet-based system for managing and delivering consumer product information to consumers along the World Wide Web (WWW), said Internet-based system comprising:

a plurality of Web-based information servers, operably connected to the infrastructure of the Internet, serving a plurality of Web-sites on the WWW, wherein each said Web-site includes a plurality of HTML-encoded documents;

a plurality of Internet-based consumer product information (CPT) servers, operably connected to the infrastructure of the Internet, and serving a plurality of consumer product information (CPI) resources located on the WWW having information content, and related to a particular consumer product or group of consumer products registered with said Internet based system and being marketed along the WWW;

a first Internet-based subsystem, operably connected to the infrastructure of the Internet, and configured to allow manufacturer team members associated with said particular consumer product or group of consumer products, and/or authorized parties, to implement a plurality of consumer product information (CPI) requesting and graphical user interface (GUI) displaying subsystems for said plurality of consumer products being marketed along the WWW, so that each said CPI-requesting and GUI-displaying subsystem is accessed by consumers at points of presence along the WWW, using a client subsystem supporting a Web browser;

an object-oriented server operably connected to the infrastructure of the Internet;

wherein each said CPI-requesting and GUI-displaying subsystem is implemented by (i) a consumer product information request (CPIR) enabling object stored on and executed within said object-oriented server independent of the operation of said Internet-based CPI servers, and (ii) an HTML tag embodied with a unique URL referencing said CPIR-enabling object, and embedded within at least one of a thumb-nail picture, an arbitrary graphical object, an information request icon, and a hypertext-type link;

wherein said object-oriented server generates each said CPI-requesting and GUI-displaying subsystem and serves a CPI graphical user interface (GUI) at the point of presence, for displaying a set of said plurality of CPI resources for selection by the consumer;

a database, operably connected to said object-oriented server, and storing and managing a link structure for each consumer product registered with said Internet-based system, wherein each said link structure includes a product identifier assigned to the consumer product registered within said Internet-based system, and a set of URLs set of said plurality of CPI resources being served frons said plurality of Internet-based CPI servers;

wherein said CPIR-enabling object installed on said object-oriented server, for each said consumer product, includes code stored on a medium operable to execute on the obect-oriented server, and specifying:

(i) a connection to said database;

(ii) a CPI query to be executed on said database, dependent on the product identifier assigned to said consumer product, and returning a set of URLs stored in said database and associated with said product identifier; and (iii) a CPI GUI, object-oriented controlled, displaying the results of the product identifier dependent CPI query at the point of presence where said corresponding HTML tag is embedded within at least one of said thumb-nail picture, said arbitrary graphical object, said information request icon, and said hypertext-type link;

wherein said HTML tag embodies the unique URL referencing said corresponding CPIR-enabling object;

a second Internet-based subsystem configured to allow manufacturer team members associated with a particular consumer product or group of consumer products, and/or authorized parties, to program said set of CPI resources for display in the CPI GUI of each said CPU requesting and GUI-displaying subsystem; and wherein, upon the Web-browser of the consumer encountering said HTML tag, (a) the CPIR-enabling object corresponding to the HTML tag is automatically executed, (b) the CPI GUI of the corresponding CPI requesting and GUI-displaying subsystem is automatically generated by said object-oriented server, (c) said object-oriented controlled CPI GUI is served to the Web browser at the point of presence where said HTML tag is embedded, and (d) then said object oriented controlled CPI GUI displays information content that is (i) associated with one or more CPI resources having URLs returned by said product identifier dependent CPI query, and (ii) served from one or more of said plurality of Internet-based CPI servers, for display and review by the consumer at the point of presence along the WWW where said HTML tag has been encountered by the Web browser.

* * * * *